(12) United States Patent
Yoshida et al.

(10) Patent No.: US 8,125,639 B2
(45) Date of Patent: Feb. 28, 2012

(54) TEMPERATURE COMPENSATED SPECTROSCOPE AND OPTICAL APPARATUS

(75) Inventors: Takehiro Yoshida, Hachioji (JP); Takeshi Yamazaki, Hachioji (JP); Koji Matsumoto, Hachioji (JP); Satoshi Watanabe, Tokyo (JP); Shohei Kobayashi, Hino (JP)

(73) Assignee: Olympus Corporation, Tokyo (JP)

( * ) Notice: Subject to any disclaimer, the term of this patent is extended or adjusted under 35 U.S.C. 154(b) by 175 days.

(21) Appl. No.: 12/592,743

(22) Filed: Dec. 1, 2009

(65) Prior Publication Data
US 2010/0208262 A1    Aug. 19, 2010

(30) Foreign Application Priority Data

Dec. 2, 2008  (JP) ................................. 2008-307544
Nov. 25, 2009 (JP) ................................. 2009-267656

(51) Int. Cl.
*G01J 3/28* (2006.01)

(52) U.S. Cl. ....................................................... 356/328

(58) Field of Classification Search .................. 356/328, 356/334
See application file for complete search history.

(56) References Cited

U.S. PATENT DOCUMENTS 6,169,838 B1 *  1/2001  He et al. .......................... 385/129
6,606,156 B1 *  8/2003  Ehbets et al. .................. 356/328
(Continued)

FOREIGN PATENT DOCUMENTS
JP          2000-199855          7/2000
(Continued)

*Primary Examiner* — Kara E Geisel
(74) *Attorney, Agent, or Firm* — Kenyon & Kenyon LLP

(57) ABSTRACT

A spectroscope includes an emitting portion from where light is output, a dispersive element which is disposed on a side of the light emitting portion, to which the light is output, an incidence portion on which, light dispersed by the dispersive element is incident, and a temperature-compensating element which is disposed between the emitting portion and the incidence portion, and which is such that, an angle of incidence of the light dispersed on the incidence portion becomes almost constant with respect to a change in temperature in an operating temperature range. Moreover, the optical apparatus has such spectroscope in which temperature is compensated.

9 Claims, 14 Drawing Sheets

U.S. PATENT DOCUMENTS 6,885,447 B2 * 4/2005 Suzuki et al. .................. 356/328
7,630,599 B2 * 12/2009 McLaughlin et al. .......... 385/24

FOREIGN PATENT DOCUMENTS

| JP | 2003-509714 | 3/2003 |
| JP | 3937403 | 4/2007 |
| JP | 2007-135989 | 6/2007 |
| JP | 2007-187550 | 7/2007 |
| WO | WO 01/20372 | 3/2001 |
| WO | WO 02/075410 | 9/2002 |

* cited by examiner

TEMPERATURE COMPENSATED SPECTROSCOPE AND OPTICAL APPARATUS

CROSS-REFERENCE TO RELATED APPLICATION

The present application is based upon and claims the benefit of priority from the prior Japanese Patent Application Nos. 2008-307544 filed on Dec. 2, 2008 and 2009-267656 filed on Nov. 25, 2009; the entire contents of which are incorporated herein by reference.

BACKGROUND OF THE INVENTION

1. Field of the Invention

The present invention relates to a temperature compensated spectroscope and an optical apparatus.

2. Description of the Related Art

A large number of apparatuses in which, spectroscopic technique is used have hitherto been proposed. A spectroscopic instrument in which, a diffraction grating is used, has been disclosed in Patent literature 1, and an endoscope in which, a diffraction grating is used, has been disclosed in Patent literature 2. Moreover, a spectromicroscope by using a prism and a digital micro mirror has been disclosed in Patent literature 3.

Moreover, a basic structure of a wavelength selective switch has been disclosed in Patent literature 4, in the name of optical add-drop multiplexer.

Here, the wavelength selective switch is a device to be placed in a node in an ROADM (reconfigurable optical add-drop multiplexer) (a system or a technology used in a large-capacity network, in which, a wavelength-multiplexed optical signal is split/inserted as an optical signal as it is), and is an optical switch which carries out for each wavelength, switching of a transmission path of a light signal which is being wavelength-multiplexed.

By the wavelength selective switch in each node, it is possible to fetch an optical signal of an arbitrary wavelength from the optical signal which has been wavelength-multiplexed, and to mix light of an arbitrary wavelength with the optical signal which has been wavelength-multiplexed. Even in this wavelength selective switch, a diffraction grating is used.

Moreover, a light dispersing device which includes a diffraction grating as a dispersive element, which is insensitive to temperature, and of which, an angle of output does not change, has been disclosed in Patent literature 5.

(Patent Literature 1)

Japanese Patent Application Laid-open Publication No. 2007-187550;

(Patent Literature 2)

Japanese Patent Application Laid-open Publication No. 2007-135989;

(Patent Literature 3)

Japanese Patent Application Laid-open Publication No. 2000-199855;

(Patent Literature 4)

Japanese Patent No. 3937403 Specification;

(Patent Literature 5)

Japanese National Publication of translated version No. 2003-509714

SUMMARY OF THE INVENTION

A spectroscope according to a first aspect of the present invention includes an emitting portion from where light is output, a dispersive element which is disposed on a side of the light emitting portion, to which the light is output, an incidence portion on which, light dispersed by the dispersive element is incident, and a temperature-compensating element which is disposed between the emitting portion and the incidence portion, and which is such that, an angle of incidence of the light dispersed on the incidence portion becomes almost constant with respect to a change in temperature in an operating temperature range.

An optical apparatus according to a second aspect of the present invention includes the abovementioned spectroscope, an optical system which is disposed between the emitting portion and the dispersive element, a light deflecting member which is disposed between the dispersive element and the incidence portion, and the light deflecting member includes a plurality of deflecting elements, and the plurality of deflecting elements can be controlled mutually independently.

DETAILED DESCRIPTION OF THE INVENTION

To start with, a dispersive element used in a spectroscope and an optical apparatus of the present invention will be described below. Next, the optical apparatus, which includes the dispersive element, will be described below.

Figure 6A:
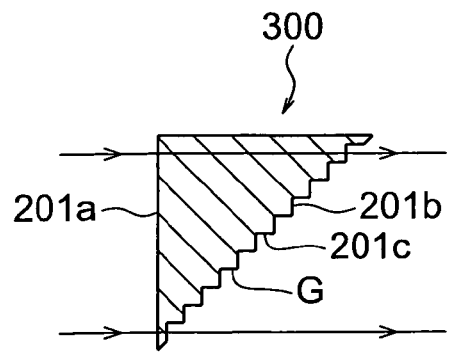
FIG. 6A, FIG. 6B, FIG. 6C, and FIG. 6D are other diagrams explaining the dispersive element of the present invention.
Figure 6B:
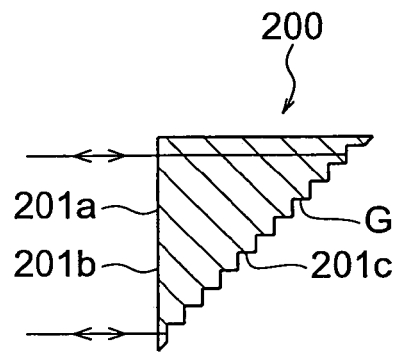

FIG. 6B shows a dispersive element 200 according to the present invention. In FIG. 6B, the dispersive element 200 is formed of a medium having a refractive index higher than 1. More concretely, the dispersive element 200 is formed by a prism.

The dispersive element 200 has an input surface 201a on which, light is incident, an output surface from which light is launched, and a diffracting optical surface 201c. Here, the diffracting optical surface 201c is provided in an optical path from the input surface 201a up to the output surface 201b. In the dispersive element 200, the same surface of the prism is the input surface 201a and the output surface 201b. A reflecting diffraction grating G is formed on the diffracting optical surface 201c. In this manner, the dispersive element 200 has a structure of a so-called immersion grating.

As it has been described above, in the dispersive element 200, a side on which, light rays are incident on the reflecting diffraction grating G and a side from which light rays are diffracted are filled in a medium which is uniform and transparent with respect to a wavelength used. The medium, in general, is a solid or a liquid. For instance, silicon can be used as the medium.

Figure 6C:
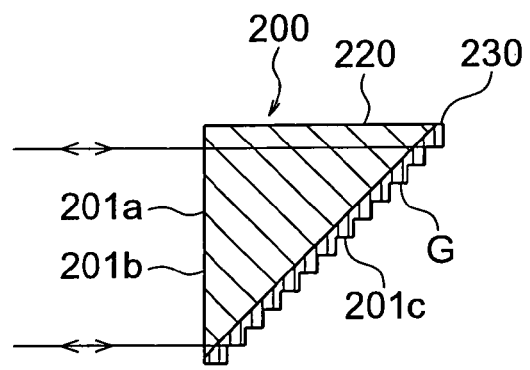
Figure 6D:
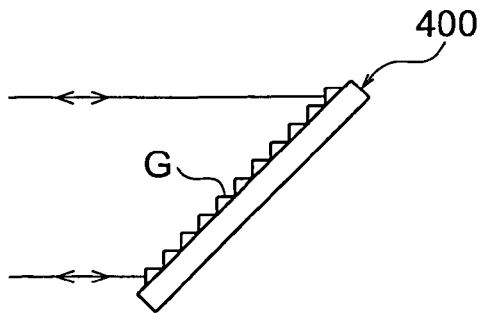

Furthermore, the dispersive element 200, as shown in FIG. 6C, may be let to have a structure in which, a flat-surface member 230 on which, the reflecting diffraction grating G, which is a separate body, is formed, is bonded to a prism 220. At this time, it is desirable to form the flat-surface member 230 and the prism 220 of the same medium. Moreover, as a modified example, the structure may be let to be of a transmission prism such as a dispersive element 300 shown in FIG. 6A. For reference, FIG. 6D shows a structure of a normal reflecting diffraction grating.

Figure 5:
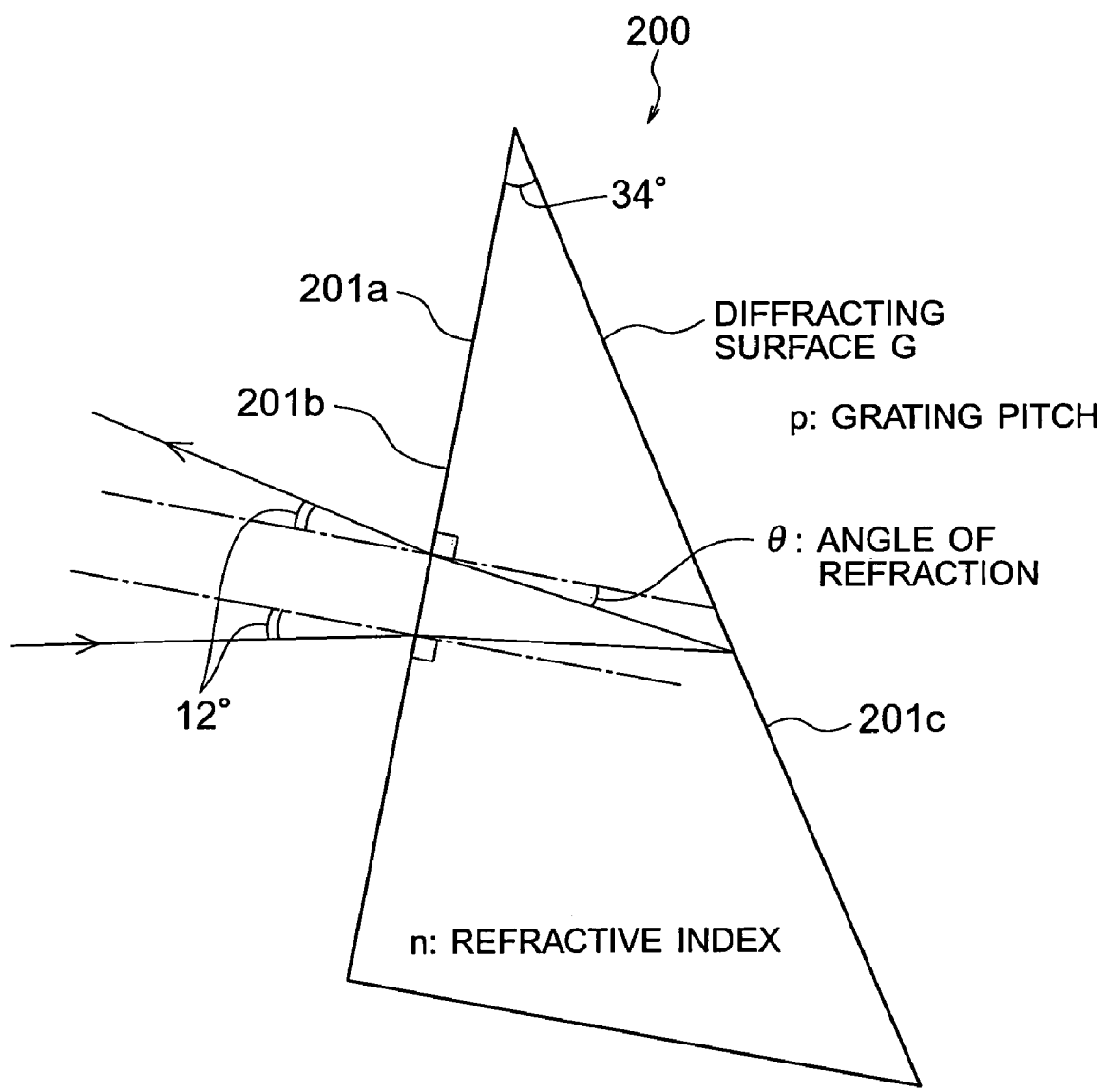
FIG. 5 is a diagram explaining a dispersive element of the present invention.

Next, the dispersive element 200 will be described in further detail by using FIG. 5. In FIG. 5, the dispersive element 200 is formed by a medium having a refractive index higher than 1. The dispersive element 200 in FIG. 5 is also formed by a prism. The dispersive element 200 has an input surface 201a on which light is incident, an output surface 201b from where the light is launched, and a diffracting optical surface 201c. In this case, the diffracting optical surface 201c is disposed in an optical path from the input surface 201a up to the output surface 201b.

Here, a process after the light is incident on the dispersive element 200 till the light is launched will be examined in detail.

In FIG. 5, a medium or groove density for which, an apex angle is 34°, an angle of incidence with respect to the input surface 201a is 12°, and an angle of output with respect to the output surface 201b is 12° is defined in this case.

Firstly, a case in which, the medium is air, or in other words, it means a simple reflecting diffraction grating. The groove density required for having the abovementioned angle of incidence and angle of output is 707.73 grooves/mm. Moreover, an angle of output for each wavelength is as shown in the following table 1. Furthermore, an angle of dispersion is 0.09307°.

Next, in the dispersive element 200 (prism), in the case of the medium thereof is S-BSL 7 manufactured by OHARA Co. Ltd., a refractive index for the wavelength used is approximately 1.5. The groove density in this case is 1075.1 grooves/mm. Moreover, the angle of output for each wavelength is as shown in the following table 1, and the angle of dispersion is 0.13547. This angle of dispersion is 1.46 times as compared to a case of air.

Moreover, in the dispersive element 200 (prism), in the case of the medium thereof is S-LAH 60 manufactured by OHARA Co. Ltd., the refractive index for the wavelength used is approximately 1.8. The groove density in this case is 1293.6 grooves/mm. The angle of output for each wavelength is as shown in the following table 1, and the angle of dispersion is 0.16061. This angle of dispersion is 1.73 times as compared to the case of the air.

Moreover, in the dispersive element (prism), in the case of the medium thereof is silicon, the refractive index for the wavelength used is approximately 3.475. The groove density in this case is 2509.9 grooves/mm. The angle of output for each wavelength is as shown in the following table 1, and the angle of dispersion is 0.23298. This angle of dispersion is 3.28 times as compared to the case of the air.

TABLE 1

| | Frequency | | |
|---|---|---|---|
| | 193.8 THz | 193.9 THz | 194.0 THz |
| | | Wavelength in air | |
| | 1546.50 nm | 1545.70 nm | 1544.91 nm |
| Groove density (medium) | 707.73 grooves/mm (air) | | |
| Refractive index | 1 | 1 | 1 |
| Angle of output (°) | 12.04658 | 12 | 11.95351 |
| Angle of dispersion (°) | | 0.09307 | |
| Groove density (medium) | 1075.1 grooves/mm (S-BSL 7) | | |
| Refractive index | 1.500295 | 1.500305 | 1.500315 |
| Angle of output (°) | 12.0678 | 12 | 11.93233 |
| Angle of dispersion (°) | | 0.13547 | |
| Groove density (medium) | 1293.6 grooves/mm (S-LAH 60) | | |
| Refractive index | 1.79987 | 1.799885 | 1.799899 |
| Angle of output (°) | 12.08038 | 12 | 11.91977 |
| Angle of dispersion (°) | | 0.16061 | |
| Groove density (medium) | 2509.9 grooves/mm | | |
| Refractive index | 3.475077 | 3.475141 | 3.475205 |
| Angle of output (°) | 12.15275 | 12 | 11.84757 |
| Angle of dispersion (°) | | 0.30518 | |

The abovementioned groove density can be calculated by the following expressions (3) and (4).

$$\begin{cases} \sin 12° = n\sin\theta & (3) \\ \dfrac{m\lambda}{p} = n\sin(34° + \theta) + n\sin(34° - \theta) & (4) \end{cases}$$

Here, n is a refractive index of the medium of the dispersive element 200 (prism), θ is an angle of refraction when light rays at the angle of incidence 12° are incident on the medium, m (=1) is a diffraction order, λ is a wavelength used, and p is a grating pitch.

Accordingly, for the dispersive element 200, diffraction gratings with larger groove density than for a conventional reflecting diffraction grating 400 (FIG. 6A), can be used. Therefore, the large dispersion is achieved, or in other words, high wavelength resolution is achieved. By increasing the refractive index n of the medium of the dispersive element 200, it is possible to make the groove density further larger. Therefore, it is possible to accomplish the dispersive element with a high-dispersion (having a high wavelength resolution).

In the dispersive element 200, it is desirable that a surface on which, light rays are incident at an inside, and a surface 201a from which the light rays are launched from the inside are common, and the angle of incidence and the angle of output at that surface is almost same. When such an arrangement is made, an AR (anti-reflection) coat which is to be applied on that common surface can be used with only one type, and it is possible to make transmittance high. Moreover, it is possible to use the purpose of designing and applying the AR coat by one type of coat.

It is desirable that the groove density on a diffracting optical surface G is not less than 1200 grooves/mm.

Moreover, it is desirable that a wavelength resolution R of the dispersive element 200 satisfies the following expression (5).

$$R = \frac{\lambda}{\Delta\lambda} > 1500 \qquad (5)$$

Here, λ is the wavelength used and Δλ is a difference in two adjacent wavelengths which are to be resolved. In any of the cases, a high wavelength resolution is achieved.

Next, a spectroscope and an optical apparatus in which, the dispersive element having the abovementioned structure is used, will be described below. In the following description, a deflecting prism is used as a temperature-compensating element.

First Embodiment

A spectroscope and an optical apparatus according to a first embodiment of the present invention will be described below. The optical apparatus is a fluorescent detecting system of a microscope (scanning optical microscope apparatus).

Figure 1:
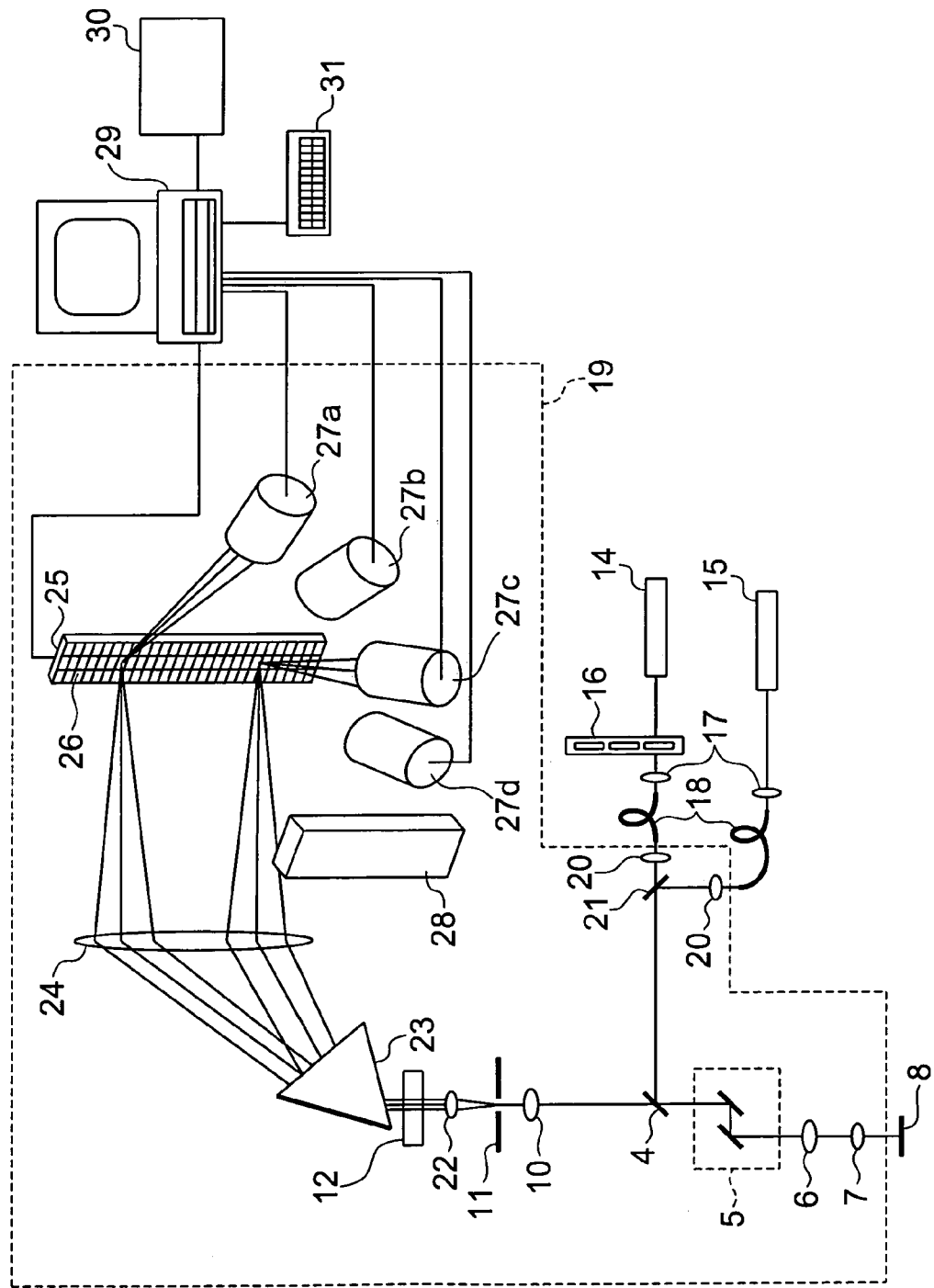
FIG. 1 is a diagram showing a microscope according to a first embodiment of the present invention.

FIG. 1 is a diagram showing a structure of the fluorescent detecting system of the scanning optical microscope apparatus according to the first embodiment. An optical apparatus of the first embodiment has a multi line Kr—Ar laser 14 which emits simultaneously laser beams of wavelengths 488 nm, 568 nm, and 647 nm, and an Ar laser 15 which emits laser beam of wavelength 351 nm, as a light source. A laser beam emitted from each laser passes through a fiber coupling lens 17, and upon passing through a single-mode fiber 18, is introduced to a scanning optical microscope main body 19. An excitation wavelength of a laser beam output from the multi line Kr—Ar laser 14 can be selected by a laser line filter 16. Each laser beam introduced to the scanning optical microscope main body 19 is converted to a parallel light beam having an appropriate beam diameter in a beam collimating lens 20, and a laser beam from the multi line Kr—Ar 14 and a laser beam from the Ar laser 15 are mixed by a dichroic mirror 21. The mixed laser beam, upon being reflected by the dichroic mirror 21 for excitation 4, is deflected at an X-Y scanning optical system 5 such as a galvanometer mirror, and via a pupil relay lens 6 and an objective lens 7, scans on a sample 8 by a laser spot.

Fluorescent light from the sample 8 which is excited by irradiation of the laser beam returns to a path from the objective lens 7 to the dichroic mirror 4, and upon passing through the dichroic mirror 4, is focused at an image forming lens 10, and passes through a confocal diaphragm 11. Light beam which is converted to parallel light upon passing through the confocal diaphragm 11 is incident on a grating 23 through a deflecting prism 12.

A dispersive element having a structure similar to the dispersive element 200 in FIG. 5, FIG. 6A, FIG. 6B, FIG. 6C, and FIG. 6D is to be used as the grating 23.

The light incident on the grating 23 is launched upon being dispersed at an angle peculiar to each laser wavelength, and upon passing through a focusing lens 24, is formed as an image on a mirror array 25.

The focusing lens 24 is also replaceable by an optical system having a refractive index in a direction of a spectral resolution, such as a cylindrical lens.

Figure 7:
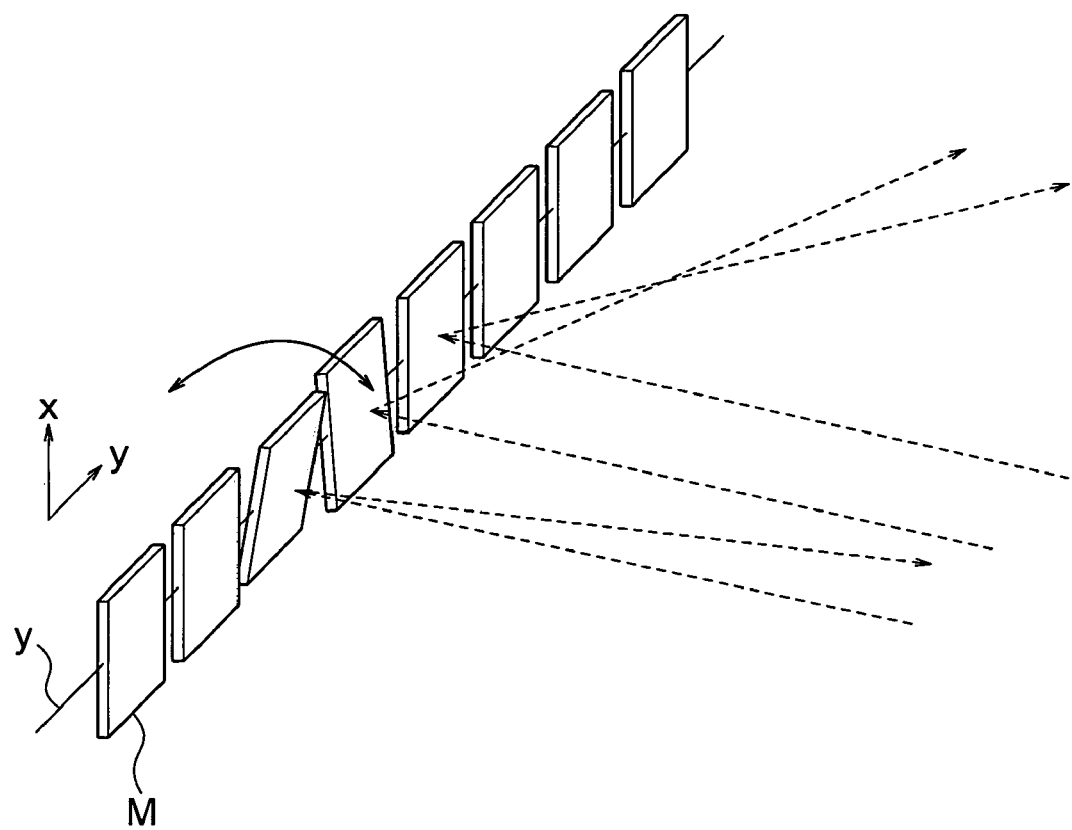
FIG. 7 is a diagram explaining a micro mirror array in an optical apparatus of the present invention.

A digital micro mirror device (DMD) shown in FIG. 7 can be used as the mirror array 25. FIG. 7 shows a perspective view of the mirror array (DMD) 25. A plurality of micro mirrors M (deflecting elements) is disposed one-dimensionally along Y-axis. Moreover, the micro mirrors M are controlled to be inclinably movable independently around x-axis and y-axis. According to this structure, an angle of output of each laser wavelength from the grating 23 is replaced by position information on the mirror array 25, and a position of a micro mirror element (M) 26 which forms the mirror array 25, corresponds to each laser wavelength as it is.

Each micro mirror element 26 has five selectable angles of reflection namely, deflection angles at which, the light beams incident thereon are reflected toward photodetecting units 27a, 27b, 27c, and 27d (hereinafter, 'photodetecting units 27a to 27d'), and a deflection angle at which the light beam incident thereon is reflected toward an optical trap 28. The angle can be selected in units of one element by an electric signal from a controller 29 through an input section 31. Moreover, when some sort of input corresponding to laser or fluorescent dye is carried out at the input section 31, the controller 29 calls the angle of each micro mirror element 26 stored in a memory section 30, and an optimum measuring condition can be reproduced at any time. Moreover, it is also possible to store only an angle of a predetermined micro mirror element 26 in the memory section 30.

Dispersed light of fluorescent light which is multiplexed, is achieved by the micro mirror element 26 corresponding to the laser wavelength reflecting the light incident toward the optical trap 28, and the micro mirror element 26 corresponding to the fluorescent light wavelength reflecting to each of the photodetecting units 27a to 27d for each fluorescent light, and an intensity thereof is detected in each of the photodetecting units 27a to 27d. In this manner, in the apparatus of the first embodiment, since the dispersion is carried out by the reflection only once irrespective of the number of fluorescent dyes to be multiplexed, the loss of amount of light becomes extremely small.

In FIG. 1, pin hole 11 is an output portion from where the light is launched, a collimating lens 22 is an optical system which is disposed at a side to which, the light is launched from the pin hole 11, the grating 23 is a dispersive element which is disposed at a side to which, the light is launched from the collimating lens 22, the DMD 25 is a light deflecting member which is disposed at a side to which, the light is launched from the grating 23, and the optical detecting units 27a to 27d are incidence portions on which, the light from the DMD 25 is incident.

Here, the deflecting prism 12 is a prism which makes output the light incident from the collimating lens 22 to the grating 23 upon deflecting. Conditions such as a shape, a position, and a medium of this deflecting prism 12 are set such that, an angle of incidence of the dispersed light from the mirror array 25 on the incidence portion (photodetecting units 27a to 27d) is almost constant with respect to a change in temperature in an operating temperature range. It is preferable that the medium of the deflecting prism 12 is same as a medium of the grating 23. Moreover, the deflecting prism 12 can be disposed at an arbitrary position, provided that the position is in an optical path from the confocal diaphragm (pin hole) 11 as an output portion, to the photodetecting units 27a to 27d as the incidence portion.

It is desirable that a material of the deflecting prism 12 and a material of the grating 23 are same. Concretely, silicon is desirable as a material of the deflecting prism 12 and the grating 23. Refractive index n of silicon is higher as compared to a refractive index of a normal glass, and an absolute value of a temperature coefficient of the refractive index |dn/dT| is also higher as compared to that of a normal glass. Consequently, in the case of the grating is formed of silicon as a material, when there is a temperature change, an angle of dispersion and a direction of output change substantially. Incidentally, in the case of the deflecting prism 12 and the grating 23 are of the same material, it is possible to cancel the change in the refractive index of silicon.

In other words, it is possible to make an arrangement such that, even when there is a change in temperature, the angle of dispersion and the direction of output do not change. The deflecting prism 12 is disposed between the collimating lens 22 and the grating 23. Moreover, the concrete shape of the deflecting prism 12 is a prism shape which is shown by reference numeral 710 in FIG. 8 or reference numeral 810 in FIG. 9.

Furthermore, the material of the deflecting prism 12 and the material of the grating 23 may be different.

A temperature-compensating element is let to be a prism which is made of a medium having a refractive index $n_P$, and a temperature coefficient of refractive index $dn_P/dT$. Moreover, the grating 23 is let to be made of a medium having a refractive index $n_G$, and a temperature coefficient of refractive index $dn_G/dT$.

For instance, in the case of the medium of the prism is let to be SF 4 manufactured by Schott Inc., and the medium of the grating is let to be NFK 5 manufactured by Schott Inc., for light having temperature not higher than 0°, and wavelength 1547.7 nm $n_P$=1.7187

$dn_P/dT$=5.275×10$^{-6}$ $n_G$=1.4730

$dn_G/dT$=−1.363×10$^{-6}$.

Here, $dn_P/dT$ and $dn_G/dT$ are average temperature coefficients of temperature 0° C. to 80° C. in the operating temperature range.

At this time, $|n_P/n_G|$=1.17

$|(dn_P/dT)/(dn_G/dT)|$=3.87.

Therefore, the following expressions (6) and (7) are satisfied.

$$1 \leq |n_P/n_G| \leq 1.2 \qquad (6)$$

$$1 \leq |(dn_P/dT)/(dn_G/dT)| \leq 4 \qquad (7)$$

Moreover, at this time, the following expression (8) is satisfied. Therefore, expression (9) is satisfied.

$$\left| \left( \frac{dn_P}{dT} \Big/ n_P \right) \Big/ \left( \frac{dn_G}{dT} \Big/ n_G \right) \right| = 3.318 \qquad (8)$$

$$1 \leq \left| \left( \frac{dn_P}{dT} \Big/ n_P \right) \Big/ \left( \frac{dn_G}{dT} \Big/ n_G \right) \right| \leq 4 \qquad (9)$$

When the expressions (6) and (7) are satisfied simultaneously, or when the expression (9) is satisfied, even in the case of the material of the deflecting prism 12 and the material of the grating 23 are different, it is possible to make an arrangement such that when there is a temperature change, the angle of dispersion and the direction of output do not change.

Moreover, in the case of the material of the deflecting prism 12 and the material of the grating 23 are different, options for the material increase, and it is possible to select an appropriate material in a range satisfying the expression (9). In a case of selecting a material from normal optical glass, since there are more materials of high availability, it is advantageous at the time of procurement of the material. At the same time, since there are many materials of which, the refractive index n and the temperature coefficient dn/dT of the refractive index are known in detail, a detailed optical designing becomes possible.

Here, the operating temperature range is a temperature range in which, the spectroscope and the optical apparatus of the present invention are to be used, and is a range from 0° C. to 40° C. for example. Moreover, in a spectroscope including the pin hole 11 as the output portion, the grating 23 as the dispersive element, the photodetecting units 27a, 27b, 27c, and 27d as the incidence portions, and the deflecting prism 12, it is preferable that the light output from the output portion is a signal light which is wavelength-multiplexed, and from among the signal light which is dispersed by the dispersive element, two signal lights having adjacent wavelengths λ1 and λ2 satisfy the following expression (1).

$$\left| \frac{\Delta \theta}{\theta_1 - \theta_2} \right| < 0.1 \qquad (1)$$

where,

θ1 is an angle at which, the signal light of wavelength λ1 reaches the incidence portion, θ2 is an angle at which, the signal light of wavelength λ2 reaches the incidence portion, and Δθ is a change in amount of angle θ1 due to the temperature change in the operating temperature range.

Assuming that the signal lights having the adjacent wavelengths λ1 and λ2, which are dispersed by the dispersive element in advance, are incident on adjacent predetermined micro mirrors of DMD, the fluorescent detecting system of the microscope is structured such that the expression (1) is satisfied. Accordingly, even when the refractive index of the grating 23 has changed due to the temperature change, and dispersion characteristics are changed, lights of wavelengths λ1 and λ2 are incident on the predetermined micro mirrors of DMD. As a result, by controlling the angle of each micro mirror, it is possible to separate λ1 and λ2 spectroscopically.

Moreover, in the case of the medium of the grating 23 and the medium of the deflecting prism 12 are same, in addition to the abovementioned effect, a degree of indefiniteness of change in the refractive index when the temperature change has occurred, decreases by one.

Accordingly, an assuredness of the optical designing improves. Moreover, there is an effect that mix-up of the materials at the time of processing can be avoided.

In this manner, preferably, it is desirable that the refractive indices and temperature coefficients (amount of change of refractive index with respect to the temperature change) of the temperature-compensating element and the dispersive element are substantially same.

Moreover, it is desirable that out of the signal light dispersed by the dispersive element, two signal lights having the adjacent wavelengths λ1 and λ2 satisfy the following expression (2).

$$\left| \frac{\Delta y}{y_1 - y_2} \right| < 0.1 \qquad (2)$$

where, y1 is a position where, the signal light of wavelength λ1 reaches the incidence portion, y2 is a position where, the signal light of wavelength λ2 reaches the incidence portion, and Δy is a change in amount of the position y1 due to the temperature change in the operating temperature range.

Figure 14A:
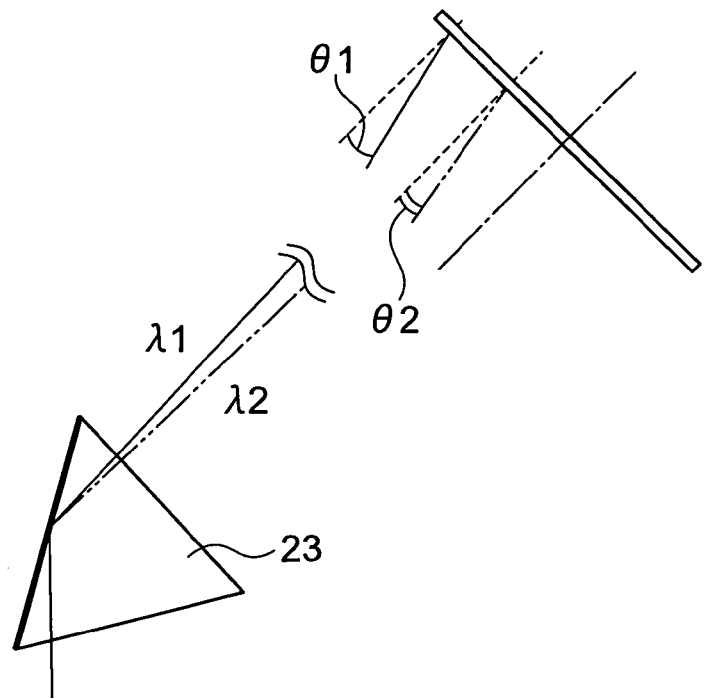
FIG. 14A is a diagram showing θ1 and θ2.
Figure 14B:
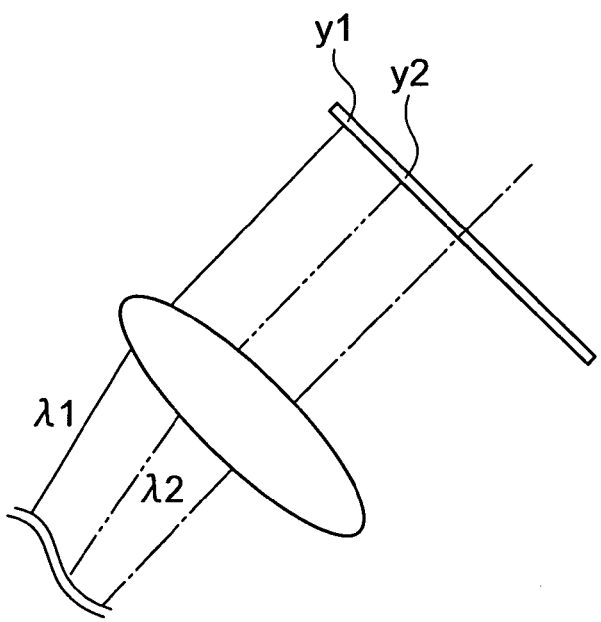
FIG. 14B is a diagram showing y1 and y2.

In the abovementioned expression, θ1 and θ2 are as shown in FIG. 14A. In FIG. 14A, reference numeral 23 denotes grating. Moreover, in FIG. 14A, the lens 24 in FIG. 1 is not disposed. Whereas, y1 and y2 are as shown in FIG. 14B. In FIG. 14B, the grating 23 is omitted. Moreover, in FIG. 14B, the lens 24 is disposed similarly as in FIG. 1 before the incidence portion. The grating 23 being positioned at a focal position of the lens 24, lights of wavelengths λ1 and λ2 reach the incident portion upon becoming light parallel to an optical axis.

Moreover, the DMD 25 includes a plurality of micro mirrors. Each of the micro mirrors is controllable independently.

In the first embodiment, a dispersive element of a second embodiment is used instead of a conventional prism (without a diffracting optical surface). Therefore, fluorescent light from a sample can be dispersed with a high wavelength resolution.

By forming the fluorescent optical system of the microscope in this manner, even when the refractive index of the grating 23 is changed due to the change in temperature, and the dispersion characteristics are changed, each laser wavelength is incident on a predetermined micro mirror of the DMD. Accordingly, a capability to separate the laser wavelength and the fluorescent wavelength is not impaired.

Second Embodiment

Next, an optical apparatus according to the second embodiment of the present invention will be described below. This optical apparatus is an illuminating optical system.

Figure 2:
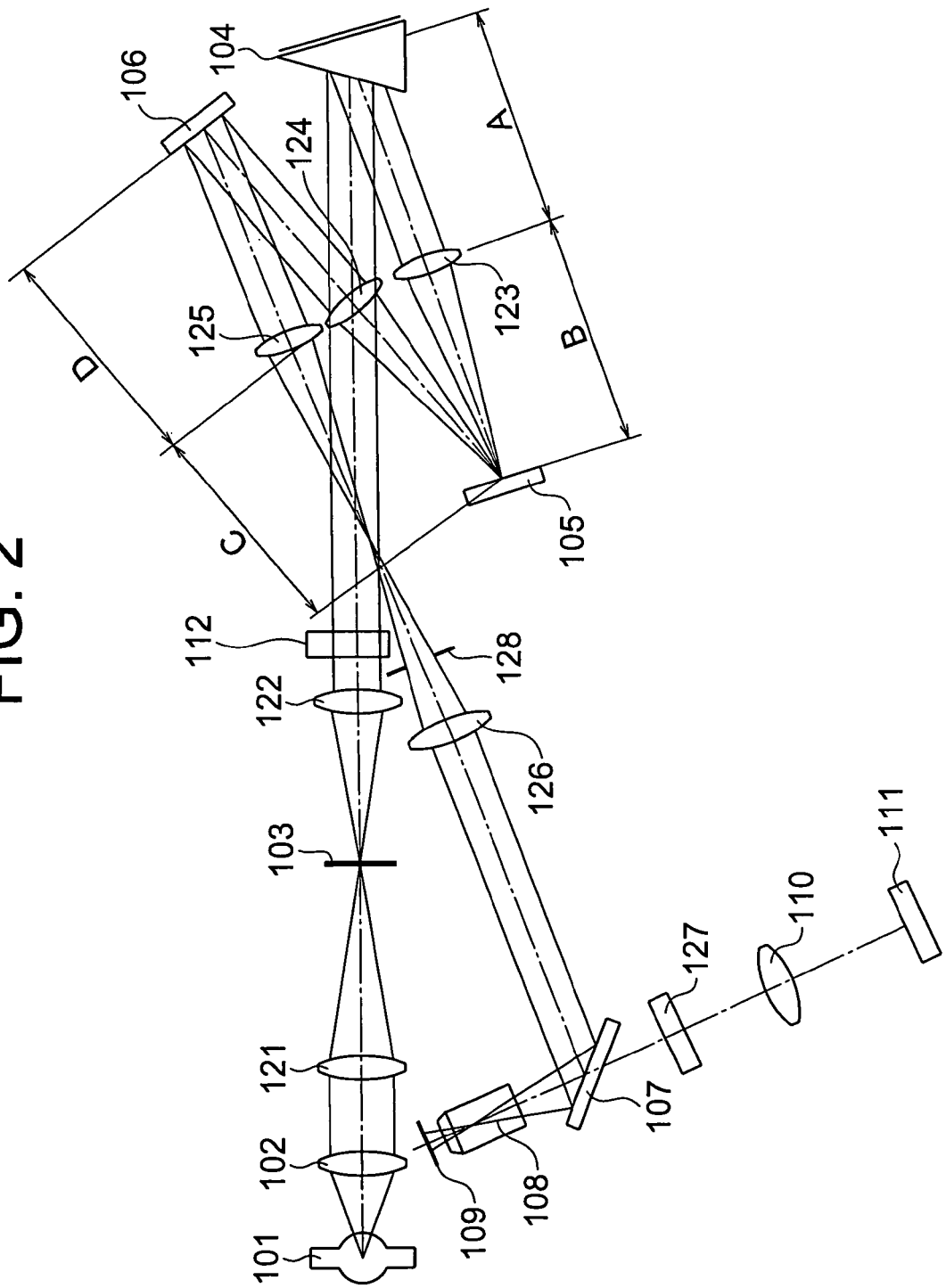
FIG. 2 is a diagram showing a microscope according to a second embodiment of the present invention.

FIG. 2 is a diagram showing a schematic structure of the illuminating optical system of a scanning optical microscope apparatus according to the second embodiment of the present invention.

The illuminating optical system of the scanning optical microscope apparatus shown in FIG. 2 is capable of illuminating with a specific wavelength. The microscope of the second embodiment is formed as a microscope having a spectroscopic illuminating unit formed by using a grating as a dispersive element.

Light emitted from a light source 101 is focused through a collector lens 102 and a projection lens 121, and creates an image of a lamp by forming once an image at a position of a diaphragm 130, which is a rectangular aperture or a pinhole aperture. Thereafter, light passed through the diaphragm 103 is incident on a lens 122, and is projected at infinity via the lens 122. Light projected at infinity is incident on a grating 104 through a deflecting prism 112, and is dispersed (wavelength dispersion) over a wavelength from a short wavelength to a long wavelength.

As the grating 104, a dispersive element having a structure similar to the dispersive element 200 in FIG. 5, FIG. 6A, FIG. 6B, FIG. 6C, and FIG. 6D is to be used. The light dispersed is incident on a lens 123, and is guided to a DMD 105. The DMD 105, similarly as (the DMD 25 in) the first embodiment, has a plurality of micro mirrors shown in FIG. 7.

In the case of a slit it disposed at a position of the diaphragm 103, the slit is projected in the form dispersed on the DMD 105. By forming the DMD 105 by a group of micro mirrors, and by changing an angle of each micro mirror, only light of a desired wavelength is reflected selectively and guided to the a lens 124.

For instance, by putting ON only a portion of the DMD 105 on which the light of short wavelength is projected, only the light of short wavelength can be guided to the sample. At the lens 124, to which, only the light of the portion put ON at the DMD 105, a dispersed slit image is projected at infinity.

The dispersed slit image which is projected at infinity is incident on a grating 106. Wavelength dispersed light which is dispersed via the grating 106, after being collected on one optical axis upon being recombined through the grating 106, is incident on a lens 125.

The light which is incident, forms an image once, as an image of the diaphragm 103 through the lens 125, and after passing through a field stop 128, is projected through a lens 126, and is reflected at a dichroic mirror 107. An image of the diaphragm 103, which is reflected, is formed at a focal position on a rear side of an objective lens 108. Moreover, it becomes Koehler illumination at a surface of a sample 9, and illuminates the sample 109.

Furthermore, in a case of using this illuminating system in fluorescent illumination, illuminating light becomes light which excites the sample 109, and illuminating light emitted from the sample 109 passes through the dichroic mirror 107, and upon passing through an absorption filter 127 which cuts leakage light of the excitation light, forms an image on a CCD 111 via an image forming lens 110.

In FIG. 2, the light source 101 is an emitting portion from which light is output, the lens 102 (the projection lens 121 and the lens 122) is an optical system disposed on a side to which, the light of the light source 101 is output, the grating 104 is a dispersive element of the second embodiment disposed on a side to which, the light output from the lens 102 (the projection lens 121 and the lens 122) is launched, the DMD 105 is a light deflecting member which is disposed on a side to which, the light of the grating 104 is launched, and the microscopic optical system (the dichroic mirror 107, the objective lens 108, and the sample 109) is an incidence portion on which, light from the DMD 105 is incident.

Here, the deflecting prism 112 is a prism which makes emerge the light incident from the lens 122 upon deflecting, toward the grating 104. Conditions such as a shape, a position and a medium of this deflecting prism 112 are set such that an angle of incidence of the dispersed light from the DMD 105 on the incidence portion (the microscopic optical system) is almost constant with respect to the change in temperature in the operating temperature range. It is preferable that a medium of the deflecting prism 112 is same as a medium of the grating 104. Moreover, the deflecting prism 112 can be disposed at an arbitrary position which is in an optical path from the light source 101 as the output portion and the microscopic optical system as the incidence portion, and which does not block an advancement of light reflected from the DMD 105.

It is desirable that a material of the deflecting prism 112 and a material of the grating 104 are same. Concretely, silicon is desirable as the material of the deflecting prism 112. Refractive index n of silicon is higher as compared to a refractive index of normal glass, and an absolute value of a temperature coefficient of the refractive index |dn/dT| is also higher as compared to that of a normal glass. Consequently, in the case of the grating is formed of silicon as a material, when there is a change in temperature, an angle of dispersion and a direction of output change substantially. Incidentally, in the case of the deflecting prism 112 and the grating 104 are of the same material, it is possible to cancel the change in the refractive index of silicon.

In other words, it is possible to make an arrangement such that, even when there is a change in temperature, the angle of dispersion and the direction of output do not change. The deflecting prism 112 is disposed between the lens 122 and the grating 104. Moreover, the concrete shape of the deflecting prism 112 is a prism shape which is shown by reference numeral 710 in FIG. 8 or reference numeral 810 in FIG. 9.

Furthermore, the material of the deflecting prism 112 and the material of the grating 104 may be different.

A temperature-compensating element is let to be a prism which is made of a medium having a refractive index $n_P$, and a temperature coefficient of refractive index $dn_P/dT$, and the grating 104 is let to be made of a medium having a refractive index $n_G$, and a temperature coefficient of refractive index $dn_G/dT$. For instance, in the case of the medium of the prism is let to be SF 4 manufactured by Schott Inc., and the medium of the grating is let to be NFK 5 manufactured by Schott Inc., for light having a temperature not higher than 0°, and wavelength 1547.7 nm $n_P = 1.7187$ $dn_P/dT = 5.275 \times 10^{-6}$ $n_G = 1.4730$ $dn_G/dT = -1.363 \times 10^{-6}$.

Here, $dn_P/dT$ and $dn_G/dT$ are average temperature coefficients of temperature 0° C. to 80° C. in the operating temperature range.

At this time, $|n_P/n_G| = 1.17$ $|(dn_P/dT)/(dn_G/dT)| = 3.87$.

Therefore, the following expressions (6) and (7) are satisfied.

$$1 \leq |n_P/n_G| \leq 1.2 \quad (6)$$

$$1 \leq |(dn_P/dT)/(dn_G/dT)| \leq 4 \quad (7)$$

Moreover, at this time, the following expression (8) is satisfied. Therefore, expression (9) is satisfied.

$$\left| \left( \frac{dn_P}{dT} \bigg/ n_P \right) \bigg/ \left( \frac{dn_G}{dT} \bigg/ n_G \right) \right| = 3.318 \quad (8)$$

$$1 \leq \left| \left( \frac{dn_P}{dT} \bigg/ n_P \right) \bigg/ \left( \frac{dn_G}{dT} \bigg/ n_G \right) \right| \leq 4 \quad (9)$$

When the expressions (6) and (7) are satisfied simultaneously, or when the expression (9) is satisfied, even when the material of the deflecting prism 112 and the material of the grating 104 are different, it is possible to make an arrangement such that when there is a temperature change, the angle of dispersion and the direction of output do not change. Moreover, when the material of the deflecting prism 112 and the material of the grating 104 are different, options for the material increase, and it is possible to select an appropriate material in a range satisfying the expression (9). In a case of selecting a material from normal optical glass, since there are more materials of high availability, it is advantageous at the time of procurement of the material. At the same time, since there are many materials of which, the refractive index n and the temperature coefficient dn/dT of the refractive index are known in detail, a detailed optical designing becomes possible.

Here, the operating temperature range is a temperature range in which, the spectroscope and the optical apparatus of the present invention are to be used, and is a range from 0° C. to 40° C. for example. Moreover, in a spectroscope including the light source 101 as the output portion, the grating 104 as the dispersive element, the microscopic optical system as the incidence portion, and the deflecting prism 112, it is preferable that the light output from the output portion is a signal light which is wavelength-multiplexed, and out of the signal light which is dispersed by the dispersive element, two signal lights having adjacent wavelengths $\lambda 1$ and $\lambda 2$ satisfy the following expression (1).

$$\left| \frac{\Delta \theta}{\theta_1 - \theta_2} \right| < 0.1 \quad (1)$$

where, $\theta 1$ is an angle at which, the signal light of wavelength $\lambda 1$ reaches the incidence portion, $\theta 2$ is an angle at which, the signal light of wavelength $\lambda 2$ reaches the incidence portion, and $\Delta \theta$ is a change in an amount of angle $\theta 1$ due to the temperature change in the operating temperature range.

Wavelength of the illuminating light is selected by letting ON the micro mirror on which, the wavelength $\lambda 1$ which is to be used as the illuminating light, is incident, and letting OFF the micro mirror on which, the wavelength $\lambda 2$ adjacent to the wavelength $\lambda 1$, which is not to be used as the illuminating light, is incident. The illuminating optical system of the microscope is structured such that, even when the refractive index of the grating 104 has changed due to the change in the temperature, and the dispersion characteristics are changed, the expression (1) is satisfied. Accordingly, the light of wavelengths $\lambda 1$ and $\lambda 2$ are incident on the same micro mirrors respectively as before the temperature has changed. In other words, an effect that a change in the control of the micro mirrors is not necessary is achieved.

Moreover, in the case of the medium of the grating 104 and the medium of the deflecting prism 112 are same, in addition to the abovementioned effect, a degree of indefiniteness of change in the refractive index when the temperature change has occurred decreases by one, thereby improving an assuredness of the optical designing. Moreover, there is an effect that mix-up of the materials at the time of processing can be avoided.

In this manner, it is preferable that out of the signal light dispersed by the dispersive element, two signal lights having the adjacent wavelengths $\lambda 1$ and $\lambda 2$ satisfy the following conditional expression (2).

$$\left| \frac{\Delta y}{y_1 - y_2} \right| < 0.1 \quad (2)$$

where, y1 is a position where, the signal light of wavelength $\lambda 1$ reaches the incidence portion, y2 is a position where, the signal light of wavelength $\lambda 2$ reaches the incidence portion, and $\Delta y$ is a change in an amount of the position y1 due to the temperature change in the operating temperature range.

By structuring the illuminating optical system of the microscope in such manner, even when the refractive index of the grating 104 has changed due to the change in temperature, and the dispersion characteristics are changed, light of the respective wavelengths from the light source 101 is incident on the predetermined micro mirrors of the DMD 105, and it is possible to guide only the light of predetermined wavelength to the lens 124 upon reflecting selectively.

The DMD 105 includes a plurality of micro mirrors. Each of the micro mirrors is controllable independently.

In the second embodiment, a dispersive element of the second embodiment is used instead of a conventional prism (without a prism). Therefore, illuminating light from the light source 101 can be dispersed with a high wavelength resolution.

Third Embodiment

Next, an optical apparatus according to a third embodiment of the present invention will be described below by referring to FIG. 3 and FIG. 8. The optical apparatus according to the third embodiment is a wavelength selective switch.

Figure 3:
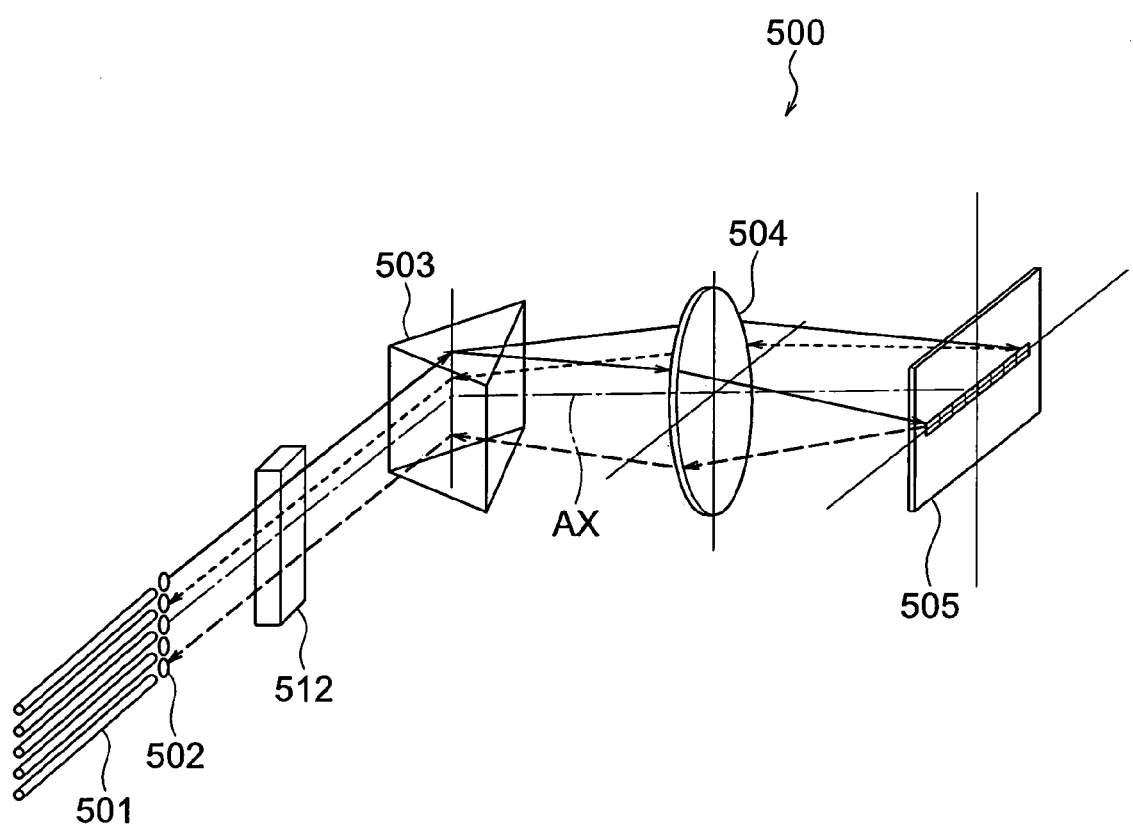
FIG. 3 is a diagram showing a wavelength selective switch according to a third embodiment of the present invention.

FIG. 3 is a perspective view showing a structure of the wavelength selective switch according to the third embodiment.

The third embodiment is a wavelength selective switch 500 of a so-called transmission type. The wavelength selective switch 500 includes a fiber array 501 made of a plurality of optical fibers, a micro lens array 502, a deflecting prism 512, a grating 503, a lens 504, and a micro mirror array 505 which is an MEMS (Micro Electro Mechanical Systems) module.

Each optical fiber in the fiber array 501 and each micro lens in the micro lens array 502, form a pair. These pairs are disposed as array. The fiber array 501 functions as a light input-output port. Signal light which is wavelength-multiplexed is output from one of the optical fibers (hereinafter, called as 'a first optical fiber') toward the grating 503. Light output from the optical fiber is converted to a parallel light beam at the micro lens array 502, and is incident on the grating 503 through the deflecting prism 512.

The dispersive element shown in FIG. 5, FIG. 6A, FIG. 6B, FIG. 6C, and FIG. 6D is to be used as the grating 503. The grating 503 disperses the wavelength-multiplexed light which is incident, in a band form.

The lens 504 guides the light dispersed by the grating 503 to a predetermined position for each wavelength, on the micro mirror array 505 which is a light deflecting member.

Here, the grating 503 is a so-called immersion grating in which, a reflecting grating G is formed on a silicon prism of an apex angle 34°. A diffracting surface is filled by silicon, and 2500 grooves are formed per mm.

The micro mirror array 505, which is the MEMS module, has an array of a plurality of micro mirrors (MEMS mirror array) corresponding to the wavelength of light dispersed in the form of a band at the grating 503.

The micro mirror M, as described by using FIG. 7, has mirrors, each rotatable around local x-axis and y-axis, and reflects light incident thereon, in a direction different from the direction of incidence by rotating mainly around y-axis.

Light reflected in the same direction (A) which differs from the direction of incidence, by the plurality of micro mirrors M of the mirror array is integrated on the grating 503 by the lens 504, and becomes the same light beam of multi wavelength component upon diffraction. Whereas, light reflected in a direction different from the direction of incidence and direction A is relayed on the grating 503 by the lens 504, and is diffracted, but is not integrated with the light reflected in direction A.

This light is incident on any fiber (hereinafter, called as 'second optical fiber') other than the first optical fiber of the fiber array 501. Moreover, the light reflected in the direction A, and the light reflected in direction other than A, are incident on different fibers.

In this manner, the multi wavelength component light output from the first optical fiber can be made to be incident selectively on the second optical fiber by a tilt angle of the respective mirrors M of the micro mirror array for each wavelength.

In this example, combining from one light input port to the plurality of light output-input ports has been described. It is also possible to combine from a plurality of light input ports to one light output port.

In the third embodiment, the fiber array 501 (the first optical fiber) is an output portion from which the light is launched, the micro lens array 502 is an optical system which is disposed on a side to which, light from the fiber array 501 is launched, the grating 503 is a dispersive element which is disposed on a side to which, light of the micro lens array 502 is launched, the micro mirror array 505 is a light deflecting member which is disposed on a side to which, light of the grating 503 is launched, and the fiber array 501 (the second optical fiber) is an incidence portion on which, light from the micro mirror array 505 is incident.

Here, the deflecting prism 512 is a prism which makes output the light incident from the micro lens array 502 upon deflecting, to the grating 503. Conditions such as a shape, a position, and a medium of this deflecting prism 512 are set such that an angle of incidence of the dispersed light from the micro mirror array 505 on the incidence portion (the second optical fiber) is almost constant with respect to the change in temperature in the operating temperature range. It is preferable that the medium of the deflecting prism 512 is same as a medium of the grating 503. Moreover, the deflecting prism 512 can be disposed at an arbitrary position provided that the position is in an optical path from the fiber as the output portion of the fiber array 501 up to the fiber as the incidence portion.

It is desirable that a material of the deflecting prism 512 and a material of the grating 503 are same. Concretely, silicon is desirable. Refractive index n of silicon is higher as compared to a refractive index of normal glass, and an absolute value of a temperature coefficient of the refractive index |dn/dT| is also higher as compared to that of a normal glass. Consequently, in the case of the grating formed of silicon as a material, when there is a change in temperature, an angle of dispersion and a direction of output change substantially. Incidentally, in the case of the deflecting prism 512 and the grating 503 are of the same material, it is possible to cancel the change in the refractive index of silicon.

In other words, it is possible to make an arrangement such that, even when there is a change in temperature, the angle of dispersion and the direction of output do not change. The deflecting prism 512 is disposed between the micro lens array 502 and the grating 503. Moreover, the concrete shape of the deflecting prism 512 is a prism shape which is shown by reference numeral 710 in FIG. 8 or reference numeral 810 in FIG. 9.

Furthermore, the material of the deflecting prism 512 and the material of the grating 503 may be different.

A temperature-compensating element is let to be a prism which is made of a medium having a refractive index $n_P$, and a temperature coefficient of refractive index $dn_P/dT$, and the grating 503 is let to be made of a medium having a refractive index $n_G$, and a temperature coefficient of refractive index $dn_G/dT$. For instance, in the case of the medium of the prism is let to be SF 4 manufactured by Schott Inc., and the medium of the grating is let to be NFK 5 manufactured by Schott Inc., for light having a temperature not higher than 0°, and wavelength 1547.7 nm $n_P=1.7187$ $dn_P/dT=5.275\times10^{-6}$ $n_G=1.4730$ $dn_G/dT=-1.363\times10^{-6}$.

Here, $dn_P/dT$ and $dn_G/dT$ are average temperature coefficients of temperature 0° C. to 80° C. in the operating temperature range.

At this time, $|n_P/n_G|=1.17$ $|(dn_P/dT)/(dn_G/dT)|=3.87$.

Therefore, the following expressions (6) and (7) are satisfied.

$1 \leq |n_P/n_G| \leq 1.2$ (6)

$1 \leq |(dn_P/dT)/(dn_G/dT)| \leq 4$ (7)

Moreover, at this time, the following expression (8) is satisfied. Therefore, expression (9) is satisfied.

$$\left| \left( \frac{dn_P}{dT} \Big/ n_P \right) \Big/ \left( \frac{dn_G}{dT} \Big/ n_G \right) \right| = 3.318 \quad (8)$$

$$1 \leq \left| \left( \frac{dn_P}{dT} \Big/ n_P \right) \Big/ \left( \frac{dn_G}{dT} \Big/ n_G \right) \right| \leq 4 \quad (9)$$

When the expressions (6) and (7) are satisfied simultaneously, or when the expression (9) is satisfied, even in the case of the material of the deflecting prism 512 and the material of the grating 503 are different, it is possible to make an arrangement such that when there is a temperature change, the angle of dispersion and the direction of output do not change.

Moreover, in the case of the material of the deflecting prism 512 and the material of the grating 503 are different, option for the material increase, and it is possible to select an appropriate material in a range satisfying the expression (9). In a case of selecting a material from normal optical glass, since there are more materials of high availability, it is advantageous at the time of procurement of the material. At the same time, since there are many materials of which, the refractive index n and the temperature coefficient dn/dT of the refractive index are known in detail, a detail optical designing becomes possible.

Here, the operating temperature range is a temperature range in which, the spectroscope and the optical apparatus of the present invention are to be used, and is a range from 0° C. to 40° C. for example. Moreover, in a spectroscope including the fiber array 501 (the first optical fiber) as the output portion, the grating 503 as the dispersive element, the fiber array 501 (the second optical fiber) as the incidence portion, and the deflecting prism 512, it is preferable that the light output from the output portion is a signal light which is wavelength-multiplexed, and out of the signal light which is dispersed by the dispersive element, two signal lights having adjacent wavelengths $\lambda1$ and $\lambda2$ satisfy the following expression (1).

$$\left| \frac{\Delta\theta}{\theta_1 - \theta_2} \right| < 0.1 \quad (1)$$

where, $\theta1$ is an angle at which, the signal light of wavelength $\lambda1$ reaches the incidence portion, $\theta2$ is an angle at which, the signal light of wavelength $\lambda2$ reaches the incidence portion, and $\Delta\theta$ is a change in an amount of angle $\theta1$ due to the temperature change in the operating temperature range. Furthermore, it is preferable that out of the signal light dispersed by the dispersive element, two signal lights having the adjacent wavelengths $\lambda1$ and $\lambda2$ satisfy the following conditional expression (2).

$$\left| \frac{\Delta y}{y_1 - y_2} \right| < 0.1 \quad (2)$$

where, y1 is a position where, the signal light of wavelength $\lambda1$ reaches the incidence portion, y2 is a position where, the signal light of wavelength $\lambda2$ reaches, and $\Delta y$ is a change in an amount of the position y1 due to the temperature change in the operating temperature range.

Next, an application example of the wavelength selective switch according to the third embodiment will be described below. FIG. 8 is a plan view showing an example of a structure of the wavelength selective switch according to the third embodiment.

This wavelength selective switch is a wavelength selective switch of a so-called transmission type, and includes a fiber array 701 made of a plurality of optical fibers, a lens 702, a focusing lens 703, a first bulk lens 704, a deflecting prism 710, a reflecting member 705, a grating 720, a second bulk lens 706, and a micro mirror array 730 which is an MEMS module.

Figure 8:
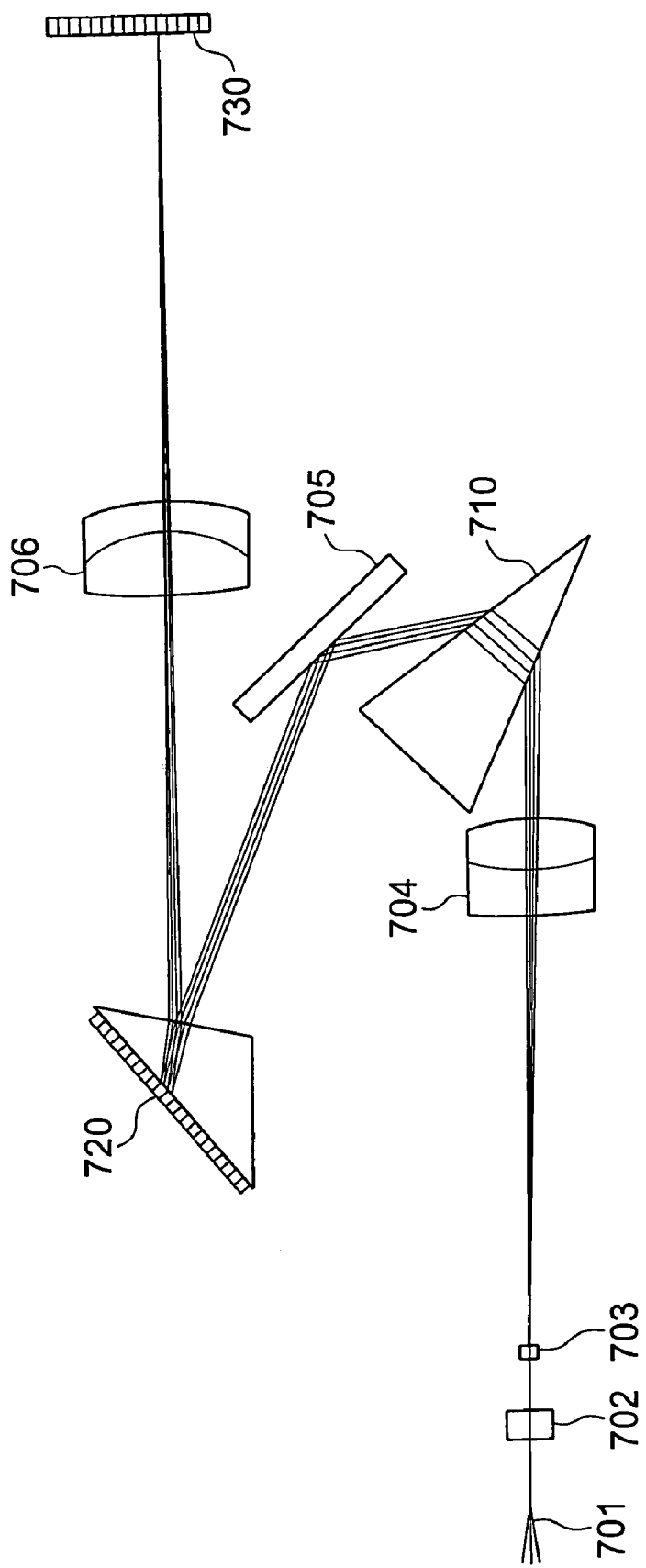
FIG. 8 is a plan view showing an example of a structure of the wavelength selective switch according to the third embodiment of the present invention.

In the wavelength selective switch shown in FIG. 8, the fiber array 701 is an output portion from where the light is output, the lens 702, the focusing lens 703, and the first bulk lens 704 form an optical system disposed on a side to which, light from the fiber array 701 is launched, the grating 720 is a dispersive element which is disposed on a side to which, light of the lens 702 is launched, the micro mirror array 730 is a light deflecting member which is disposed on a sided to which, light of the grating 720 is launched, and the fiber array 701 is an incidence portion on which, light from the micro mirror array 730 is incident.

Since the fiber array 701, the deflecting prism 710, the grating 720, the second bulk lens 706, and the micro mirror array 730 shown in FIG. 8 correspond to the fiber array 501, the deflecting prism 512, the grating 503, the lens 504, and the micro mirror array 505 respectively, in FIG. 3, the description in detail thereof is omitted.

In the third embodiment, the dispersive element of the third embodiment is used instead of the conventional diffraction grating (without prism). Therefore, it is possible to disperse the light from the fiber array 501 with a high wavelength resolution.

By the wavelength selective switch being structured to satisfy the expression (1) or the expression (2), even when a refractive index of the grating 503 or 720 is changed due to the change in temperature, and the dispersion characteristics are changed, light of respective wavelengths dispersed at the grating 503 or 720 is incident on the same micro mirror before the temperature has changed. Consequently, even when the temperature change has occurred, no ITU grid error in which, a wavelength incident on a center of the mirror is shifted away from an ITU grid occurs, and there is no narrowing of a transmission band (band width) of a signal light, and a performance of a favorable wavelength selective switch is retained.

Moreover, in the case of the medium of the grating 503 or 720 and the medium of the deflecting prism 512 or 710 are same, in addition to the abovementioned effect, a degree of indefiniteness of change in the refractive index when the temperature change has occurred decreases by one, and accordingly, an assuredness of the optical designing improves. Moreover, there is an effect that mix-up of the materials at the time of processing can be avoided.

Fourth Embodiment

Figure 4:
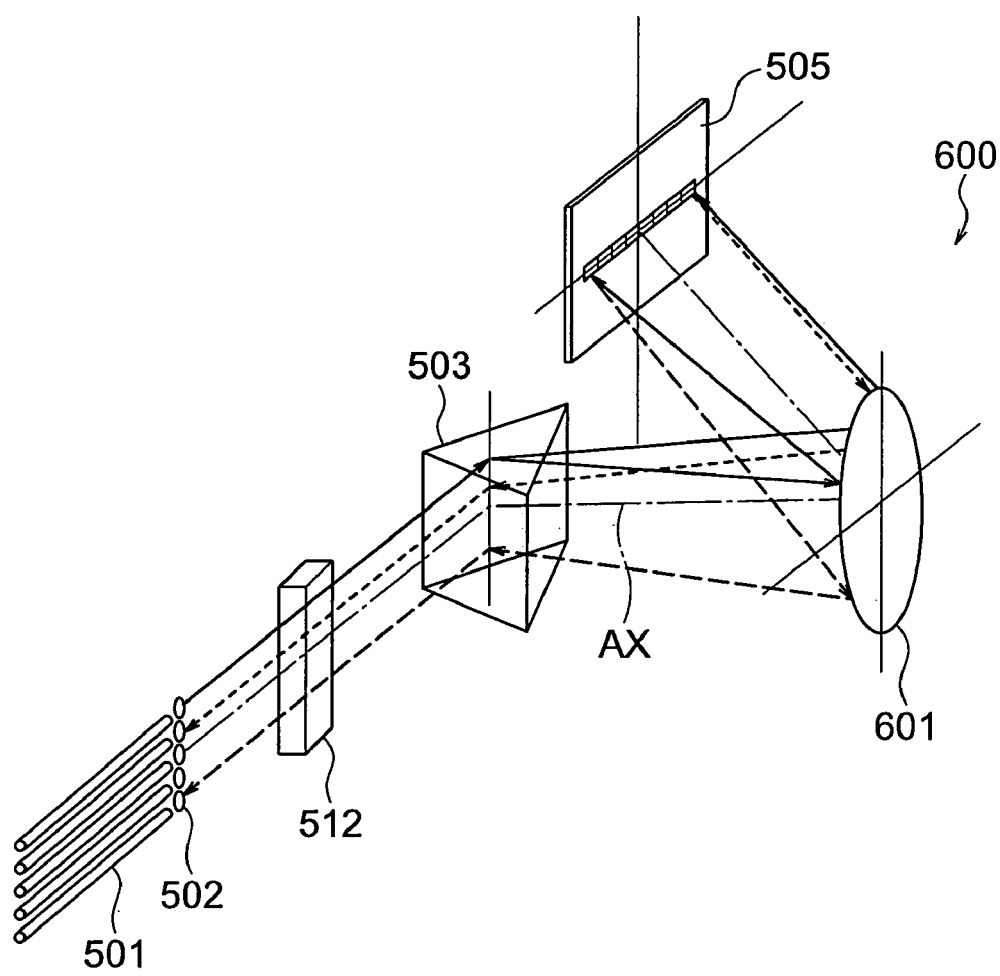
FIG. 4 is a diagram showing a wavelength selective switch according to a fourth embodiment of the present invention.

Next, an optical apparatus according to a fourth embodiment of the present invention will be described below by referring to FIG. 4. The optical apparatus according to the fourth embodiment is a wavelength selective switch. Same reference numerals are assigned to components which are same as in the third embodiment. FIG. 4 is a perspective view showing a structure of the wavelength selective switch according to the fourth embodiment.

The fourth embodiment is a wavelength selective switch 600 of a so-called reflecting type. The wavelength selective switch 600 includes the fiber array 501 made of a plurality of optical fibers, the micro lens array 502, the deflecting prism 512, the grating 503, a reflecting optical member 601, and the micro mirror array 505 which is an MEMS.

Each optical fiber in the fiber array 501 and each micro lens in the micro lens array 502, form a one-to-one pair. These pairs are disposed in an array form. The fiber array 501 functions as a light input-output port. Signal light, which is wavelength-multiplexed, is output from one of the optical fibers (hereinafter, called as 'the first optical fiber') toward the grating 503. Light output from the optical fiber is converted to a parallel light beam at the micro lens array 502, and is incident on the grating 503 through the deflecting prism 512.

The dispersive element shown in FIG. 5, FIG. 6A, FIG. 6B, FIG. 6C, and FIG. 6D is to be used as the grating 503. The grating 503 disperses the wavelength-multiplexed light which is incident, in a band form.

The reflecting optical member 601 guides the light dispersed by the grating 503 to a predetermined position for each wavelength, on the micro mirror array 505 which is a light deflecting member. A concave mirror can be used as the reflecting optical member 601.

Here, the grating 503 is a so-called immersion grating in which, the reflecting grating G is formed on a silicon prism of an apex angle 34°. The diffracting surface is filled by silicon, and 2500 groves are formed per mm.

The micro mirror array 505, which is the MEMS module, has an array of a plurality of micro mirrors (MEMS mirror array) corresponding to the wavelength of light dispersed in the form of a band at the grating 503.

The micro mirror M, as described by using FIG. 7, has mirrors, each rotatable around local x-axis and y-axis, and reflects light incident thereon, in a direction different from the direction of incidence by rotating mainly around y-axis.

Light reflected in the same direction (A) which differs from the direction of incidence, by the plurality of micro mirrors M of the mirror array, is integrated on the grating 503 by the reflecting optical member 601, and becomes the same light beam of multi wavelength component upon diffraction. Whereas, light reflected in a direction different from the direction of incidence and direction A is relayed on the grating 503 by the reflecting optical member 601, and is diffracted, but is not integrated with the light reflected in direction A.

This light is incident on any fiber (hereinafter, called as 'second optical fiber') other than the input port of the fiber array 501. Moreover, the light reflected in the direction A and the light reflected in direction other than direction A are incident on different fibers.

In this manner, the multi wavelength component light output from the first optical fiber can be made to be incident selectively on the second optical fiber by an angle of inclination of the respective mirrors M of the micro mirror array for each wavelength. In this example, combining from one light input port to the plurality of light output-input ports has been described. It is also possible to combine from a plurality of light input ports to one light output-input port.

In the fourth embodiment, the fiber array 501 (the first optical fiber) is an output portion from which the light is launched, the micro lens array 502 is an optical system which is disposed on a side to which, light from the fiber array 501 is launched, the grating 503 is a dispersive element which is disposed on a side to which, light of the micro lens array 502 is launched, the micro mirror array 505 is a light deflecting member which is disposed on a side to which, light of the grating 503 is launched, and the fiber array 501 (the second optical fiber) is an incidence portion on which, light from the micro mirror array 505 is incident.

In the fourth embodiment, the dispersive element of the fourth embodiment is used instead of the conventional diffraction grating (without prism). Therefore, it is possible to disperse the light from the fiber array 501 with a high wavelength resolution. Moreover, it is possible to make the optical system smaller as compared to the wavelength selective switch of the transmission type.

The deflecting prism 512 being same as the deflecting prism of the third embodiment, the description thereof is omitted.

Rest of the structure, action, and effect are similar as in the third embodiment.

In other words, even when the refractive index of the grating 503 has changed due to the change in temperature, and the dispersion characteristics have changed, each wavelength of the light separated separately at the grating 503 is incident on the same micro mirror as before the temperature has changed. Consequently, even when the temperature change has occurred, no ITU grid error in which, a wavelength incident on a center of the mirror is shifted away from an ITU grid occurs, there is no narrowing of a transmission band (band width) of a signal light, and a performance of a favorable wavelength selective switch is retained.

Moreover, in the case of the medium of the grating 503 and the medium of the deflecting prism 512 are same, in addition to the abovementioned effect, a degree of indefiniteness of change in the refractive index when the temperature change has occurred decreases by one, and accordingly, an assuredness of the optical designing improves. Moreover, there is an effect that mix-up of materials at the time of processing can be avoided.

It is desirable that a material of the deflecting prism 512 and a material of the grating 503 are same. Concretely, silicon is desirable as a material of the deflecting prism 512 and the grating 503. Refractive index n of silicon is higher as compared to a refractive index of a normal glass, and an absolute value of a temperature coefficient of the refractive index |dn/dT| is also higher as compared to that of a normal glass. In the case of the grating formed of silicon as a material, when there is a temperature change, an angle of dispersion and a direction of output change substantially. Incidentally, in the case of the deflecting prism 512 and the grating 503 are of the same material, it is possible to cancel the change in the refractive index of silicon.

In other words, it is possible to make an arrangement such that, even when there is a change in temperature, the angle of dispersion and the direction of output do not change. The deflecting prism 512 is disposed between the micro lens array 502 and the grating 503. Moreover, the concrete shape of the deflecting prism 512 is a prism shape which is shown by reference numeral 710 in FIG. 8 or reference numeral 810 in FIG. 9.

Furthermore, the material of the deflecting prism 512 and the material of the grating 503 may be different.

A temperature-compensating element is let to be a prism which is made of a medium having a refractive index $n_P$, and a temperature coefficient of refractive index $dn_P/dT$. Moreover, the grating 503 is let to be made of a medium having a refractive index $n_G$, and a temperature coefficient of refractive index $dn_G/dT$.

For instance, in the case of the medium of the prism is let to be SF 4 manufactured by Schott Inc., and the medium of the grating is let to be NFK 5 manufactured by Schott Inc., for light having temperature not higher than 0, and wavelength 1547.7 nm $$n_P = 1.7187$$

$$dn_P/dT = 5.275 \times 10^{-6}$$

$$n_G = 1.4730$$

$$dn_G/dT = -1.363 \times 10^{-6}.$$

Here, $dn_P/dT$ and $dn_G/dT$ are average temperature coefficients of temperature 0° C. to 80° C. in the operating temperature range.
At this time, $$|n_P/n_G| = 1.17$$

$$|(dn_P/dT)/(dn_G/dT)| = 3.87.$$

Therefore, the following expressions (6) and (7) are satisfied.

$$1 \leq |n_P/n_G| \leq 1.2 \quad (6)$$

$$1 \leq |(dn_P/dT)/(dn_G/dT)| \leq 4 \quad (7)$$

Moreover, at this time, the following expression (8) is satisfied. Therefore, expression (9) is satisfied.

$$\left| \left( \frac{dn_P}{dT} \bigg/ n_P \right) \bigg/ \left( \frac{dn_G}{dT} \bigg/ n_G \right) \right| = 3.318 \quad (8)$$

$$1 \leq \left| \left( \frac{dn_P}{dT} \bigg/ n_P \right) \bigg/ \left( \frac{dn_G}{dT} \bigg/ n_G \right) \right| \leq 4 \quad (9)$$

When the expressions (6) and (7) are satisfied simultaneously, or when the expression (9) is satisfied, even in the case of the material of the deflecting prism 512 and the material of the grating 503 are different, it is possible to make an arrangement such that when there is a temperature change, the angle of dispersion and the direction of output do not change.

Moreover, in the case of the material of the deflecting prism 512 and the material of the grating 503 are different, options for the material increase, and it is possible to select an appropriate material in a range satisfying the expression (9). In a case of selecting material from normal optical glass, since there are more materials of high availability, it is advantageous at the time of procurement of the material. At the same time, since there are many materials of which, the refractive index n and the temperature coefficient dn/dT of the refractive index are known in detail, a detailed optical designing becomes possible.

Examples

Figure 9:
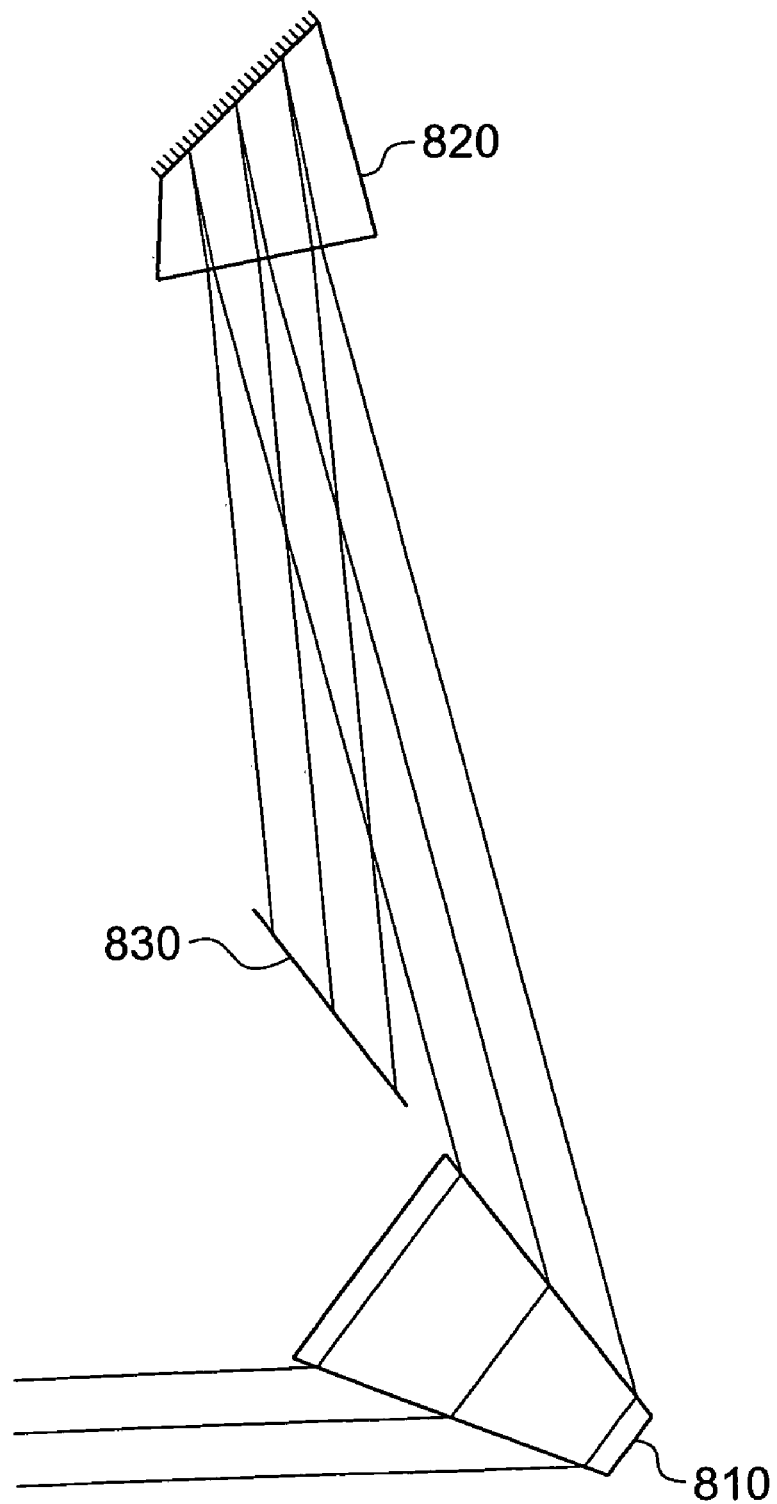
FIG. 9 is a diagram showing a structure of a spectroscope according to a first example.
Figure 10:
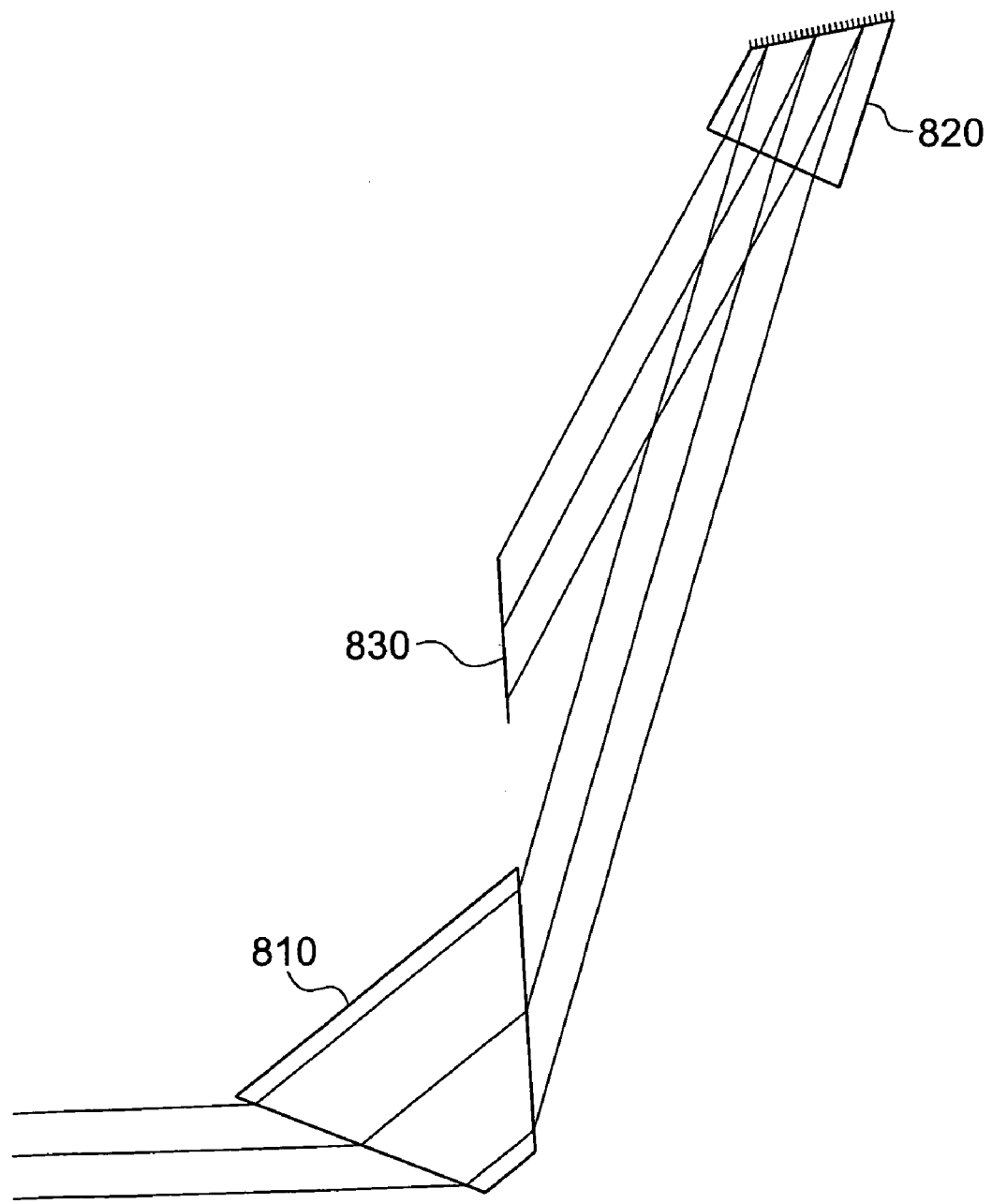
FIG. 10 is a diagram showing a structure of a spectroscope according to a second example.
Figure 11:
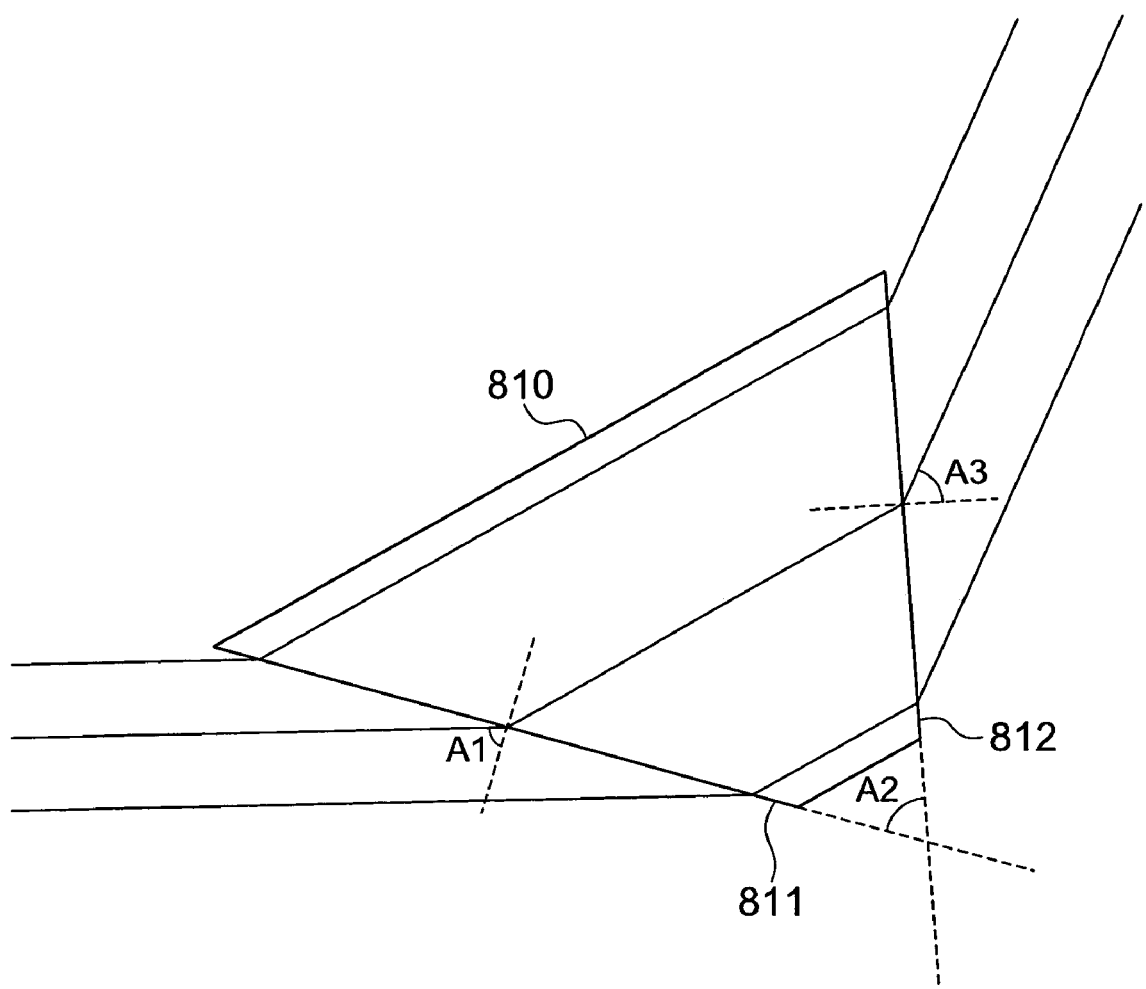
FIG. 11 is a diagram showing deflection of light in a deflecting prism of an embodiment.
Figure 12:
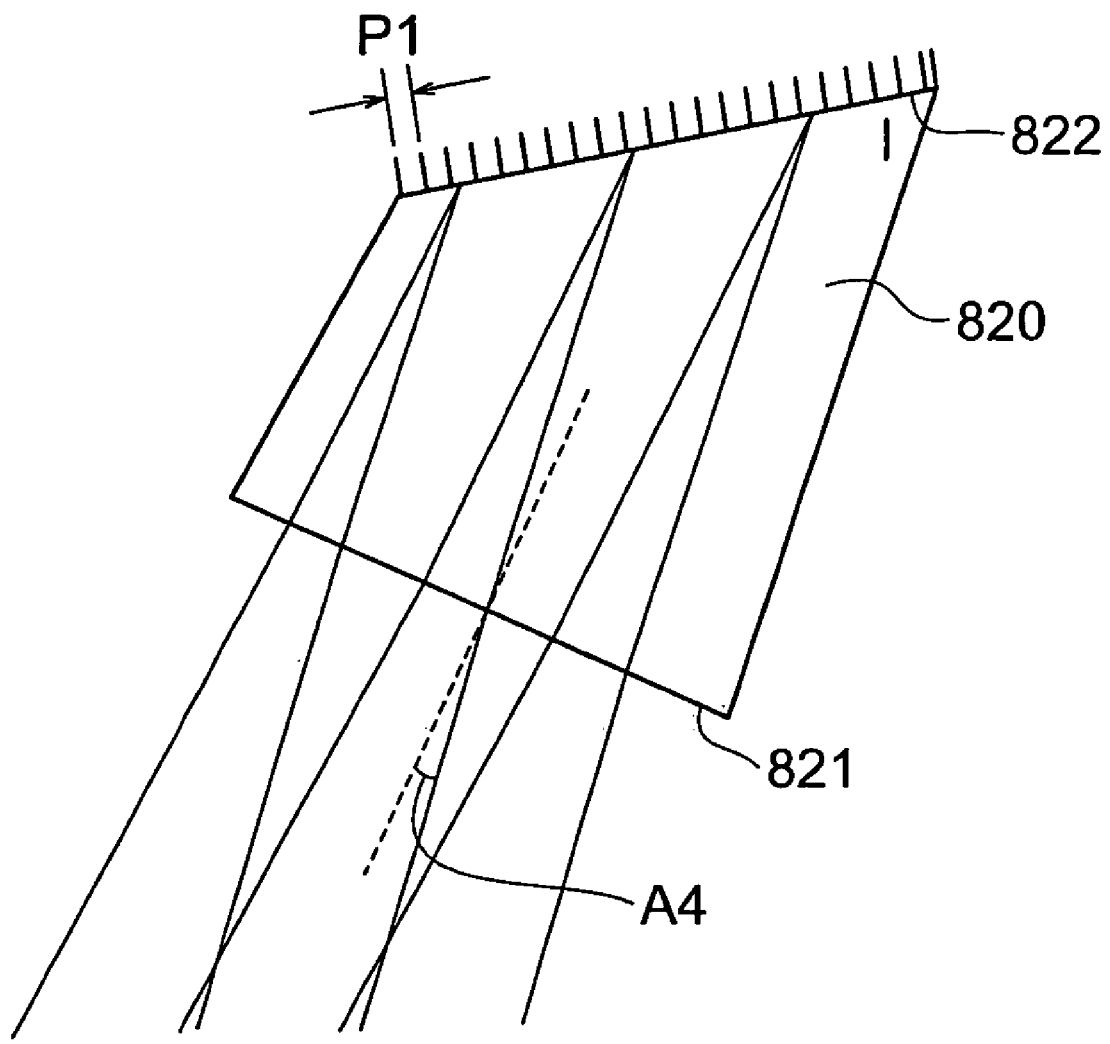
FIG. 12 is a diagram showing dispersion of light in a grating of an embodiment.
Figure 13:
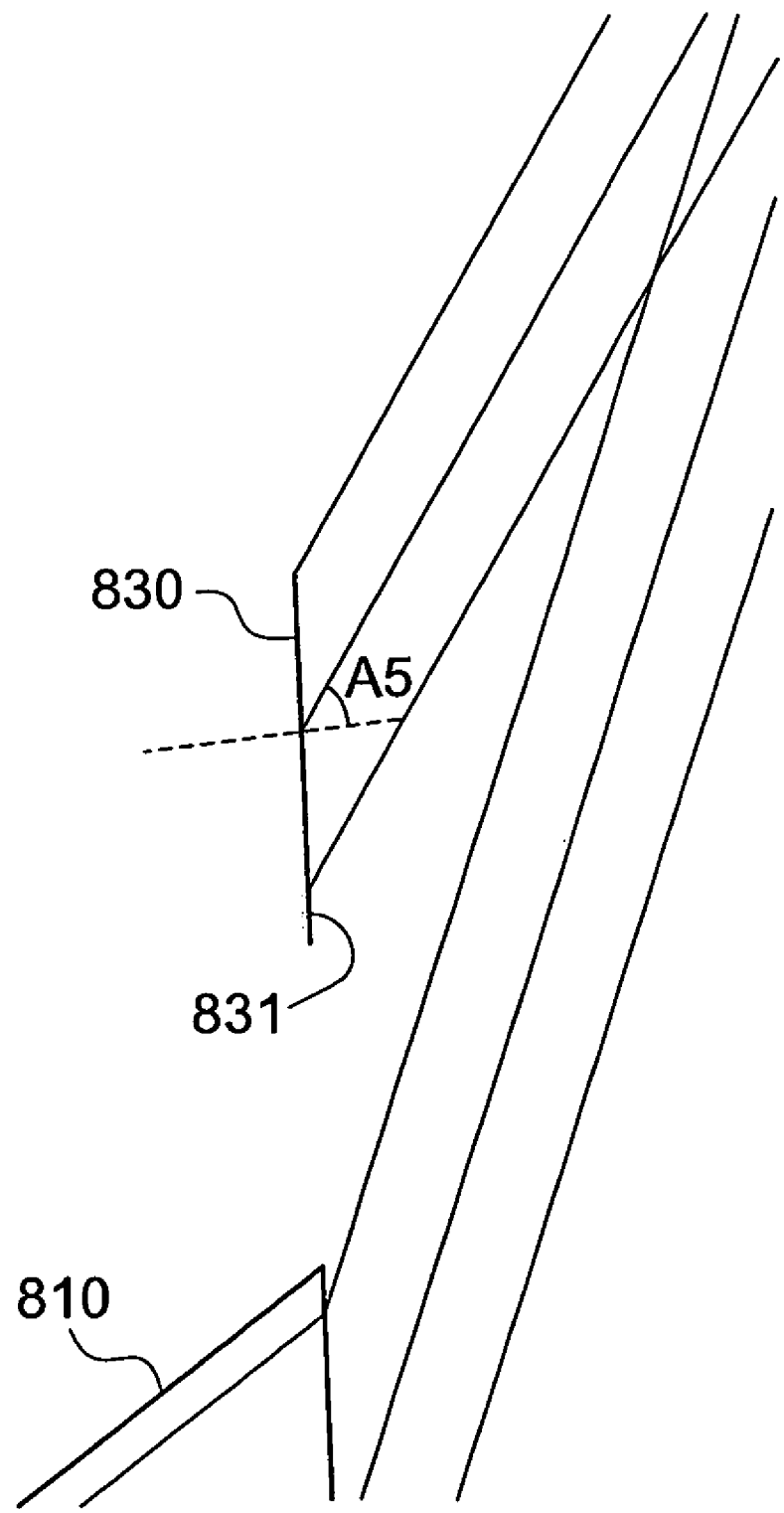
FIG. 13 is a diagram showing light incident on a micro mirror array of an embodiment.

Next, examples of the spectroscope according to the present invention will be described below by referring to diagrams from FIG. 9 to FIG. 14A and FIG. 14B. FIG. 9 is a diagram showing a structure of a spectroscope according to a first example. FIG. 10 is a diagram showing a structure of a spectroscope according to a second example. FIG. 11 is a diagram showing deflection of light in a deflecting prism 810 of an example. FIG. 12 is a diagram showing dispersion of light in a grating 820 of an example. FIG. 13 is a diagram showing light incident on a micro mirror array of an example. FIG. 14A is a diagram showing θ1 and θ2. FIG. 14B is a diagram showing y1 and y2 upon including a focusing optical system between the grating 820 and the micro mirror array 830. In diagrams from FIG. 9 to FIG. 13, an output portion, an incidence portion, and an optical system between the output portion and a spectral element are omitted.

In the spectroscope according to the first example and the second example, light output from the output portion is deflected by the deflecting prism 810, and the deflected light, upon incident on the grating 820, is incident on a predetermined position of the micro mirror array 830 upon dispersed for each wavelength. A grating shown in FIG. 5, FIG. 6A, FIG. 6B, FIG. 6C, and FIG. 6D is to be used as the grating 820, and the micro mirror array shown in FIG. 7 is to be used as the micro mirror array 830. Moreover, the deflecting prism of the abovementioned embodiments is to be used as the deflecting prism 810.

In the first example, a material having a refractive index equivalent to the refractive index of silicon is set as a material of the deflecting prism (prism) 810 and the grating 820 (immersion grating).

In the second example, a material having a refractive index equivalent to a refractive index of SF 4 (manufactured by Schott Inc.) is set as the material of the deflecting prism (prism) 810, and a material having a refractive index equivalent to a refractive index of NFK 5 (manufactured by Schott Inc.) is set as the material of the grating 820 (immersion grating).

An angle of incidence A1 on the deflecting prism (prism) 810 is an angle of incidence on a first surface 811 of the deflecting prism 810. An angle of output from the deflecting prism 810 is an angle of output from a second surface 812 of the deflecting prism 810. An apex angle A2 of the deflecting prism 810 is an inner angle made by intersection of extension lines of the first surface 811 and the second surface 812 (FIG. 11).

An angle of incidence A4 on the grating (immersion grating) 820 is an angle of incidence on a first surface 821 of the grating 820, and a pitch P1 of a diffracting surface is a pitch of grating in a diffracting surface 822 (FIG. 12).

An angle of incidence A5 on a last surface is an angle of incidence on a mirror surface 831 of the micro mirror array 830 (FIG. 13).

For each of the abovementioned conditions, a first wavelength and a second wavelength are set as a wavelength of dispersed light. Furthermore, temperature of 0° and 80° are used as a temperature corresponding to the temperature change in the operating temperature range.

The first example as results of calculations carried out based on the abovementioned conditions is shown in the following table 2.

TABLE 2

|  | 0° C. | | 80° C. | |
| --- | --- | --- | --- | --- |
|  | First wavelength | Second wavelength | First wavelength | Second wavelength |
| Wavelength (nm) | 1545.703 | 1544.906 | 1545.703 | 1544.906 |
| Angle of incidence A1 on first surface of prism (°) | 67.45146 | | | |
| Material of prism | Silicon | | | |
| Apex angle A2 of prism (°) | 30.837296 | | | |
| Refractive index of prism | 3.47371 | 3.473766 | 3.486546 | 3.486676 |
| Angle of output A3 from second surface of prism (°) | 67.45146 | 67.45589 | 68.49405 | 68.50485 |
| Angle of incidence A4 on first surface of immersion grating (°) | 5 | 5.00444 | 6.04259 | 6.0534 |
| Material of immersion grating | Silicon | | | |
| Refractive index of immersion grating | 3.47371 | 4.473766 | 3.486546 | 3.486676 |
| Pitch P1 of diffracting surface (mm) | 0.00039998 | | 0.000400067 | |
| Angle of incidence A5 on last surface (°) | 57.88135 | 58.0212 | 57.86956 | 58.0086 |
| Position of reaching on last surface (mm) | 0.0852 | 0.2316 | 0.0728 | 0.2184 |

| |Δθ| | 0.01179 |
| --- | --- |
| |θ1 − θ2| | 0.13985 |
| |Δθ/(θ1 − θ2)| | 0.08430 |
| |Δy| | 0.01235 |
| |y1 − y2| | 0.14645 |
| |Δy/(y1 − y2)| | 0.08430 |

Moreover, the second example is shown in the following table 3

TABLE 3

|  | 0° C. | | 80° C. | |
| --- | --- | --- | --- | --- |
|  | First wavelength | Second wavelength | First wavelength | Second wavelength |
| Wavelength (nm) | 1545.703 | 1544.906 | 1545.703 | 1544.906 |
| Angle of incidence A1 on first surface of prism (°) | 69.47576 | | | |
| Material of prism | SF 4 (Schott Inc.) | | | |
| Apex angle A2 of prism (°) | 66.035876 | | | |
| Refractive index of prism | 1.718703 | 1.718715 | 1.719125 | 1.719136 |
| Angle of output A3 from second surface of prism (°) | 69.47576 | 69.47783 | 69.55102 | 69.5531 |
| Angle of incidence A4 on first surface of immersion grating (°) | 5 | 5.38118 | 5.07526 | 5.07735 |
| Material of immersion grating | NFK 5 (Schott Inc.) | | | |
| Refractive index of immersion grating | 1.472958 | 1.472968 | 1.472849 | 1.472859 |
| Pitch P1 of diffracting surface (mm) | 0.000949825 | | 0.000950524 | |

TABLE 3-continued

| | | | | |
|---|---|---|---|---|
| Angle of incidence A5 on last surface (°) | 56.4759 | 56.53572 | 56.47111 | 56.53087 |
| Position of reaching on last surface (mm) | 0.0795 | 0.1421 | 0.0745 | 0.1370 |

| | |
|---|---|
| $\|\Delta\theta\|$ | 0.00479 |
| $\|\theta1 - \theta2\|$ | 0.05982 |
| $\|\Delta\theta/(\theta1 - \theta2)\|$ | 0.08007 |
| $\|\Delta y\|$ | 0.00502 |
| $\|y1 - y2\|$ | 0.06264 |
| $\|\Delta y/(y1 - y2)\|$ | 0.08007 |

Here, θ1 and θ2 are angles at which the signal light of wavelengths λ1 and λ2 reaches on the incidence portion, and in table 2 and table 3, θ1 and θ2 are equivalent to an angle A5 at which, light of the first wavelength and light of the second wavelength are incident on the last surface. Δθ is an amount of change of the angle θ1 due to the temperature change in the operating temperature range, and in table 2 and table 3, for the light of the first wavelength, a difference in the angle A5 at 0° C. and the angle of incidence A5 at 80° C. is taken.

According to the first example and the second example, it is revealed that |Δθ/(θ1−θ2)| is smaller than 0.1, and even when there is a temperature change in the operating temperature range, it has been possible to suppress the change in the dispersion characteristics to be small.

Although it is omitted in diagrams from FIG. 9 to FIG. 13, a photodetector may be disposed in a direction in which, light reflected at the micro mirror array 830 advances. Furthermore, an optical system for focusing may be disposed between the micro mirror array 830 and the photodetector. Moreover, in FIG. 8, a photodetector may be disposed instead of the micro mirror array 730. By making such an arrangement, it is possible to make function as a spectroscope. In this case, the bulk lens 706 corresponds to the optical system for focusing.

As a photodetector, in a case of using the micro mirror array 830, a two-dimensional array sensor may be used. When such an arrangement is made, even when a direction of reflection is changed at the micro mirror array 830, it is possible to receive reflected light. Moreover, in a case of using a normal mirror (direction of reflection cannot be changed) instead of the micro mirror array 830, a one-dimensional array sensor may be used as a photodetector.

An arrangement in which, next to the grating 820 in FIG. 9 is let to be as in FIG. 14B, is a spectroscope of a third example. A component corresponding to the incidence portion of FIG. 14B is a photodetector. A calculation result of y-coordinates in the case of a focal length of the focusing optical system in FIG. 14B is let to be 60 mm, and an origin is taken appropriately, is shown in the lowermost line in table 2.

An arrangement in which, next to the grating 820 in FIG. 10 is let to be as in FIG. 14B, is a spectroscope of a fourth example. A component corresponding to the incidence portion of FIG. 14B is a photodetector. A calculation result of y-coordinates in the case of a focal length of the focusing optical system in FIG. 14B is let to be 60 mm, and an origin is taken appropriately, is shown in the lowermost line in table 3.

Here, y1 and y2 are positions at which signal light of wavelengths λ1 and λ2 reach the incidence portion, and in table 2 and table 3, correspond to positions at which the light of first wavelength and the light of second wavelength is incident on the last surface.

Δy is an amount of change in the position y1 due to the temperature change in the operating temperature range, and in table 2 and table 3, for the light of first wavelength, a difference in the position y1 at 0° C. and the position y1 at 80° C. is taken.

According to the third example and the fourth example, it is revealed that |Δy/(y1−y2)| is smaller than 0.1, and even when there is a temperature change in the operating temperature range, it has been possible to suppress the change in the dispersion characteristics to be small.

In this manner, the dispersive element according to the present invention is useful in a case of dispersing at a high wavelength resolution.

According to the present invention, it is possible to provide a spectroscope in which, even when there occurs a temperature change, the change in the dispersion characteristics is sufficiently small, and an optical apparatus in which such spectroscope is used.

What is claimed is:

1. A spectroscope comprising:
an output portion from where light is output;
a dispersive element which is disposed on a side of the output portion, to which the light is output;
an incidence portion on which, light dispersed by the dispersive element is incident; and
a temperature-compensating element which is disposed between the output portion and the incidence portion, and which is such that, an angle of incidence of the light dispersed on the incidence portion becomes almost constant with respect to a change in temperature in an operating temperature range,
wherein both the dispersive element and the temperature-compensating element are made from a material for which a refractive index is higher than a refractive index of a glass, and wherein an amount of change of the refractive index with respect to the change in temperature is higher than that of the glass.

2. The spectroscope according to claim 1, wherein
the light output from the output portion is a signal light which is wavelength-multiplexed, and
among the signal light which is dispersed by the dispersive element, two signal lights of adjacent wavelengths λ1 and λ2 respectively, satisfy the following conditional expression (1)

$$\left|\frac{\Delta\theta}{\theta_1 - \theta_2}\right| < 0.1 \quad (1)$$

where,
$\theta_1$ denotes an angle at which, a signal light of wavelength λ1 reaches the incidence portion,
$\theta_2$ denotes an angle at which, a signal light of wavelength λ2 reaches the incidence portion, and $\Delta\theta$ denotes an amount of change of the angle $\theta_1$ due to the change in temperature in the operating temperature range.

3. The spectroscope according to claim 2, wherein the dispersive element is an immersion grating, and the temperature-compensating element is a deflecting prism.

4. The spectroscope according to claim 3, wherein a medium of the dispersive element and a medium of the temperature-compensating element are the same.

5. The spectroscope according to claim 3, wherein
the dispersive element is made of a medium having a refractive index $n_G$, and a temperature coefficient of the refractive index $dn_G/dT$, and the temperature-compensating element is made of a medium having a refractive index $n_p$, and a temperature coefficient of the refractive index $dn_p/dT$, and
satisfy the following conditional expressions (6) and (7) simultaneously $$1 \leq |n_P/n_G| \leq 1.2 \quad (6)$$

$$1 \leq |(dn_P/dT)/(dn_G/dT)| \leq 4 \quad (7).$$

6. The spectroscope according to claim 5, wherein the spectroscope satisfies the following conditional expression (9)

$$1 \leq \left| \left( \frac{dn_P}{dT} \Big/ n_P \right) \Big/ \left( \frac{dn_G}{dT} \Big/ n_G \right) \right| \leq 4. \quad (9)$$

7. An optical apparatus comprising:
a spectroscope according to one of claims 1 to 6;
an optical system which is disposed between the output portion and the dispersive element;
a light deflecting member which is disposed between the dispersive element and the incidence portion, wherein
the light deflecting member includes a plurality of deflecting elements, and
the plurality of deflecting elements can be controlled mutually independently.

8. The optical apparatus according to claim 7, wherein out of the signal light which is dispersed by the dispersive element, two signal lights of adjacent wavelengths $\lambda 1$ and $\lambda 2$ respectively, satisfy the following conditional expression (2)

$$\left| \frac{\Delta y}{y_1 - y_2} \right| < 0.1 \quad (2)$$

where,
$y_1$ denotes a position at which, the signal light of wavelength $\lambda 1$ reaches the incidence portion,
$y_2$ denotes a position at which, the signal light of wavelength $\lambda 2$ reaches the incidence portion, and
$\Delta y$ denotes an amount of change in the position $y_1$ due to a change in temperature in an operating temperature range.

9. The spectroscope according to claim 1, wherein at least one of the dispersive element and the temperature-compensating element is made of silicon.

* * * * *